(12) United States Patent
Dobmeier et al.

(10) Patent No.: US 6,547,219 B2
(45) Date of Patent: Apr. 15, 2003

(54) SAFETY LATCH FOR A TIRE CARRIER AND IMPROVEMENTS THEREFOR

(75) Inventors: Ludwig P. Dobmeier, Windsor (CA); Jeffrey Greaves, McGregor (CA); Donald Joseph Beneteau, Amherstburg (CA)

(73) Assignee: TKA Fabco Corp. (CA)

( * ) Notice: Subject to any disclaimer, the term of this patent is extended or adjusted under 35 U.S.C. 154(b) by 0 days.

(21) Appl. No.: 10/043,433

(22) Filed: Jan. 10, 2002

(65) Prior Publication Data

US 2002/0066894 A1 Jun. 6, 2002

Related U.S. Application Data

(63) Continuation of application No. 08/871,142, filed on Jun. 6, 1997, which is a division of application No. 08/503,241, filed on Jul. 17, 1995, now Pat. No. 6,092,790, which is a continuation-in-part of application No. 07/956,999, filed on Oct. 6, 1992, now Pat. No. 6,390,452, which is a continuation-in-part of application No. 07/639,542, filed on Jan. 10, 1991, now Pat. No. 5,188,341.

(51) Int. Cl.[7] .............................. B66D 1/00; B66C 1/34
(52) U.S. Cl. ................... 254/323; 224/42.23; 254/375; 294/82.31; 294/82.35; 414/463
(58) Field of Search .................................. 254/323, 325, 254/326, 327, 328, 342, 344, 365, 375, 376; 414/463; 224/42.23, 42.28; 294/82.31, 82.32, 82.35, 67.1

(56) References Cited

U.S. PATENT DOCUMENTS

| | | | |
|---|---|---|---|
| 2,053,976 A | | 9/1936 | Stal |
| 3,195,156 A | | 7/1965 | Phipard, Jr. |
| 3,542,413 A | * | 11/1970 | Hardison ............... 254/325 |
| 3,856,167 A | * | 12/1974 | Yasue et al. ........... 224/42.23 |
| 3,918,345 A | | 11/1975 | Phipard, Jr. |
| 4,535,973 A | | 8/1985 | Dorr et al. |
| 4,884,785 A | * | 12/1989 | Denman et al. ........ 224/42.23 |
| 5,000,495 A | | 3/1991 | Wolfgang et al. |
| 5,002,258 A | | 3/1991 | Gruber |
| 5,027,933 A | | 7/1991 | Barnum et al. |
| 5,106,134 A | | 4/1992 | Thau |
| 5,110,093 A | | 5/1992 | Rempinski et al. |
| 5,125,628 A | | 6/1992 | Rempinski et al. |
| 5,188,341 A | * | 2/1993 | Greaves ................. 254/323 |
| 5,251,877 A | | 10/1993 | Rempinski et al. |
| 5,265,708 A | | 11/1993 | Barnum et al. |
| 5,277,288 A | | 1/1994 | Barnum et al. |
| 5,314,288 A | * | 5/1994 | Schmidt ................ 254/323 |
| 5,368,280 A | | 11/1994 | Ng |
| 5,415,377 A | | 5/1995 | Britt et al. |
| 5,524,870 A | | 6/1996 | Tallent et al. |
| 5,941,675 A | | 8/1999 | Orr |
| 6,092,790 A | | 7/2000 | Dobmeier et al. |
| 6,267,546 B1 | | 7/2001 | Oxyer et al. |
| 6,293,522 B2 | | 9/2001 | Dobmeier et al. |
| 2001/0010369 A1 | * | 8/2001 | Dobmeier et al. ....... 254/323 |

FOREIGN PATENT DOCUMENTS

EP          0 501 644 A2  *  9/1992

OTHER PUBLICATIONS

Co-pending Patent Application, Ser. No. 07/956,999, Filed Oct. 6, 1992.

* cited by examiner

*Primary Examiner*—Michael R. Mansen
(74) *Attorney, Agent, or Firm*—Harness, Dickey & Pierce, P.L.C.

(57) ABSTRACT

A winch assembly includes a winch coupled to a bracket, a carrier having first and second members, and a latch coupled to one of the bracket and the first member. A flexible member extends through apertures extending through the first and second members. The first member includes a first end disposable through an aperture of the second member and a second end which may not pass through the aperture of the second member. The latch engages the other of the bracket and the first member upon a tire being moved toward a stored position. The first member is disengagable from the bracket to allow the tire to be moved to an accessible position.

10 Claims, 25 Drawing Sheets

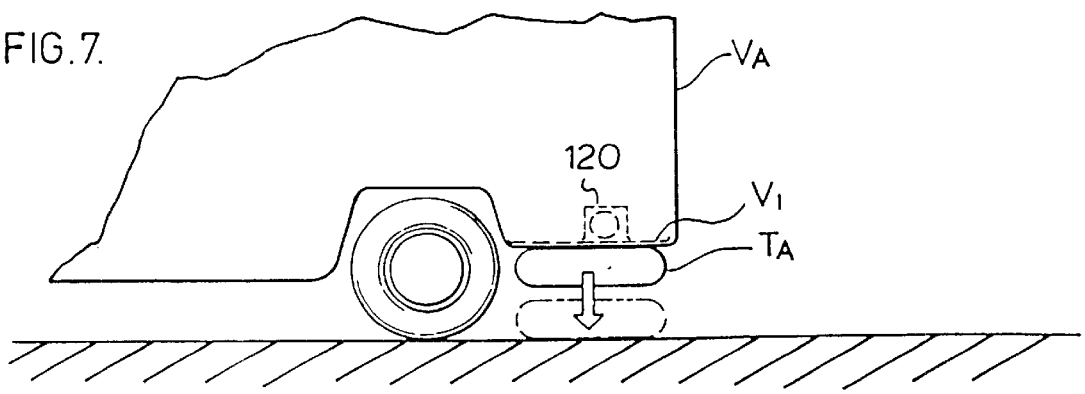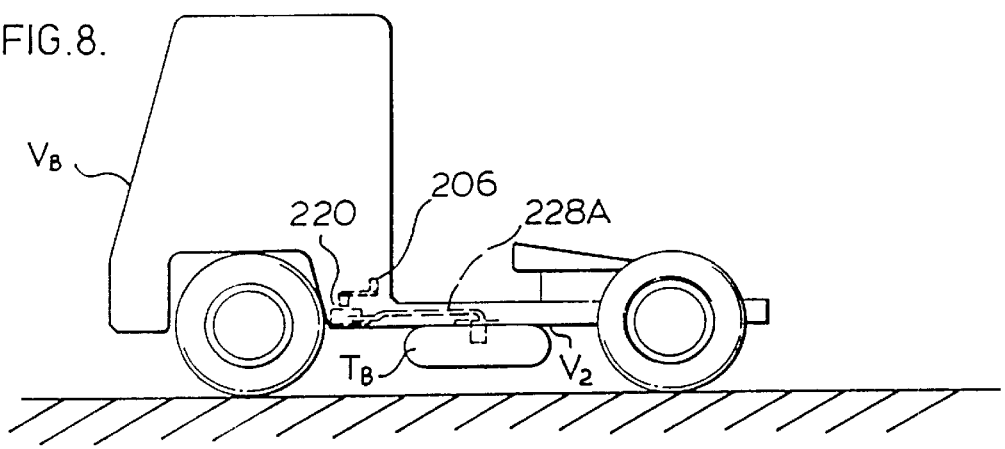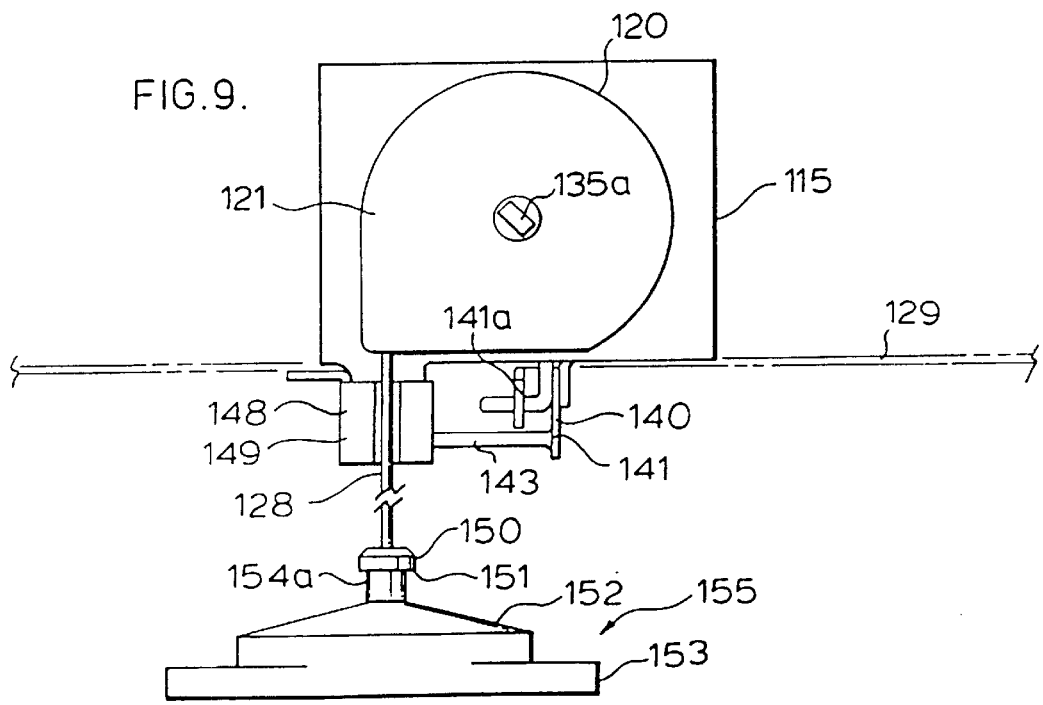

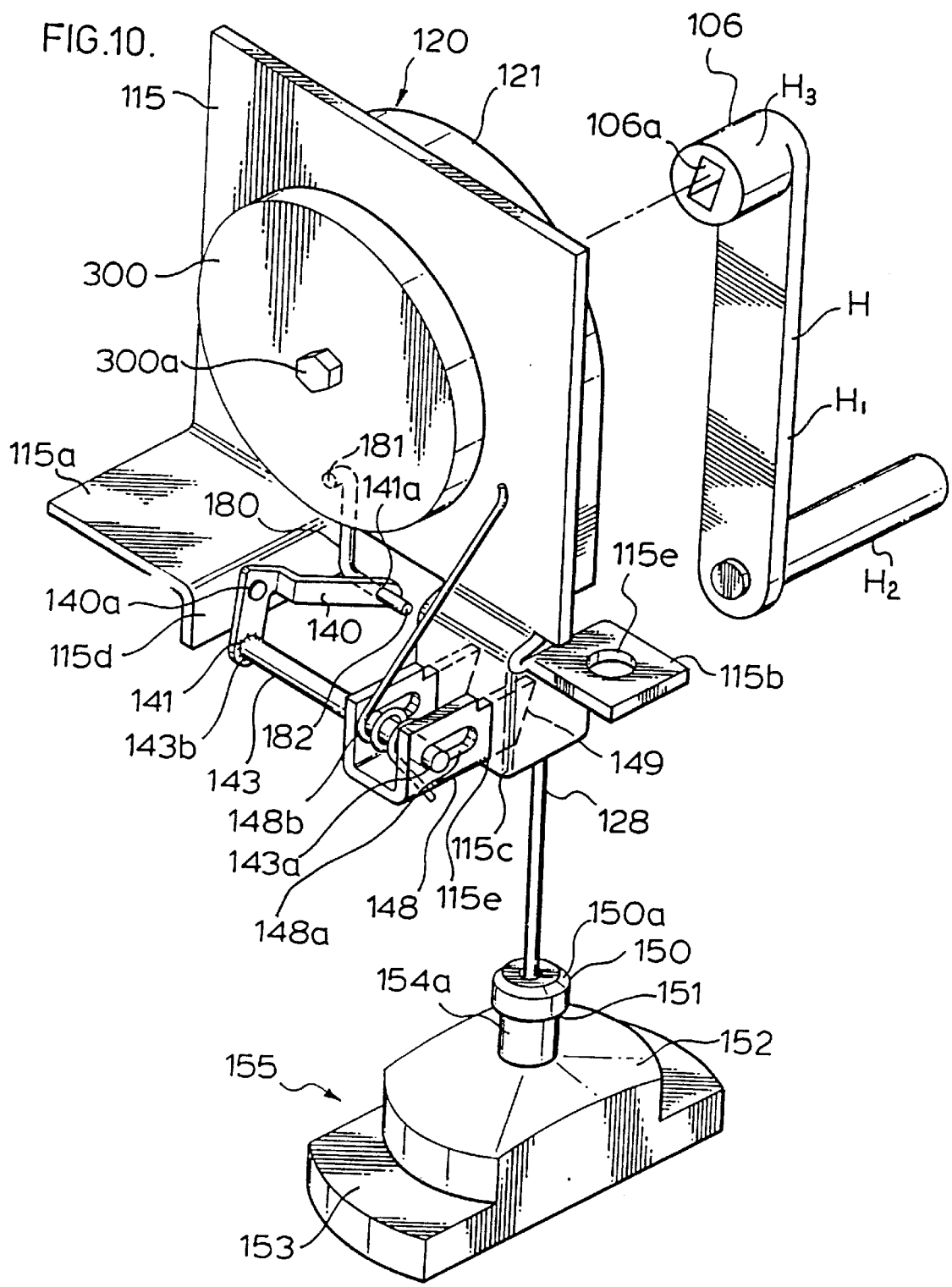

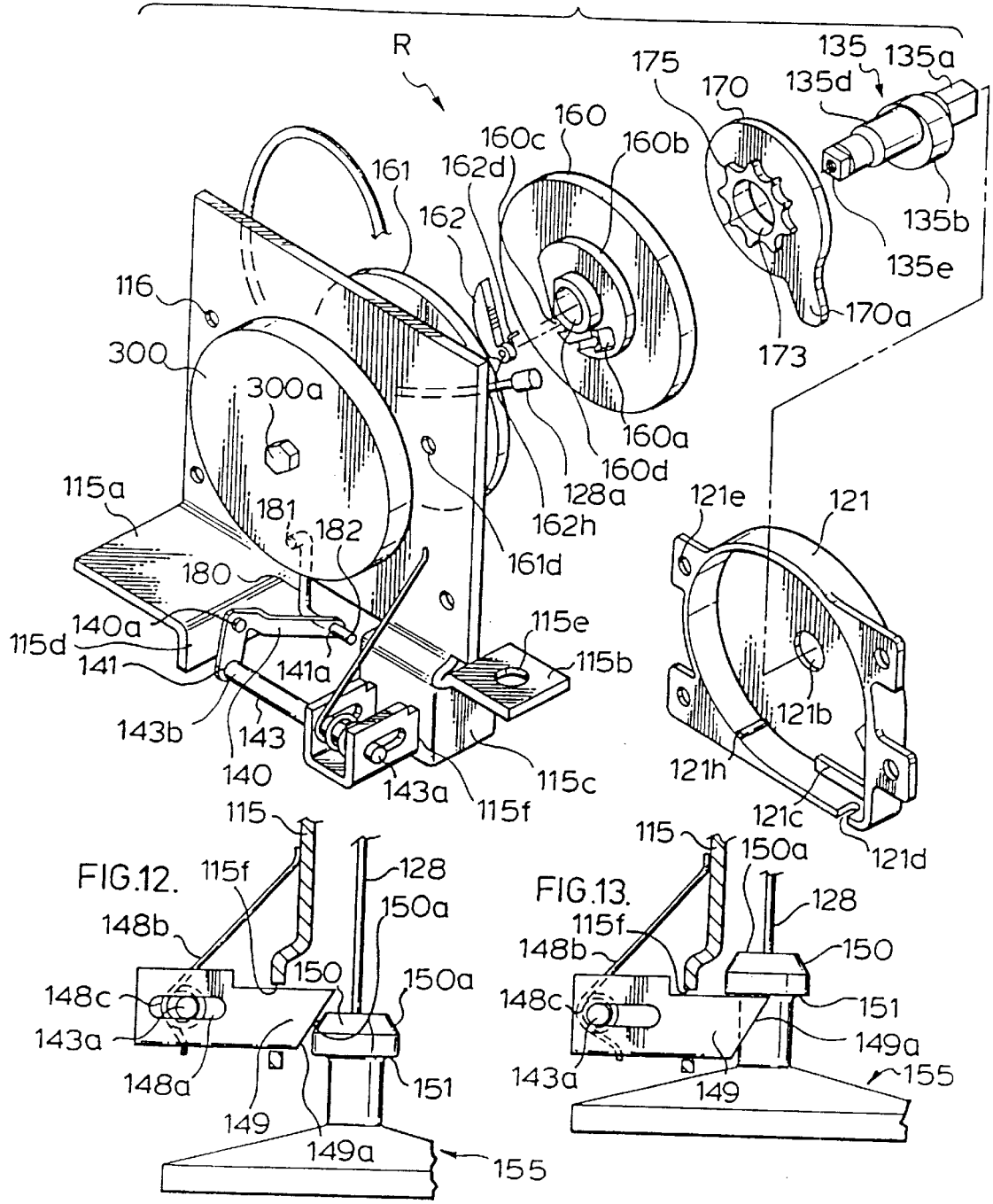

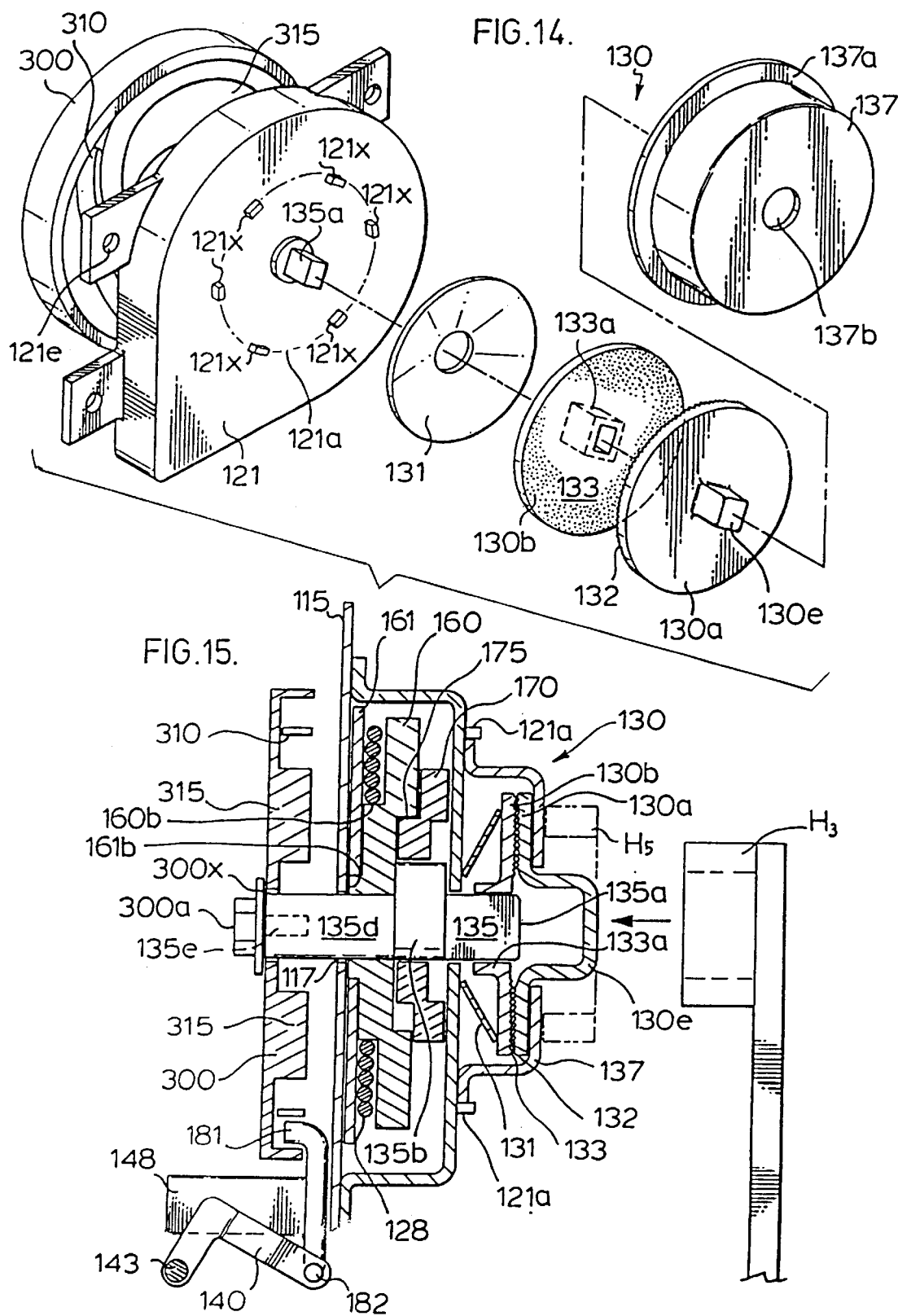

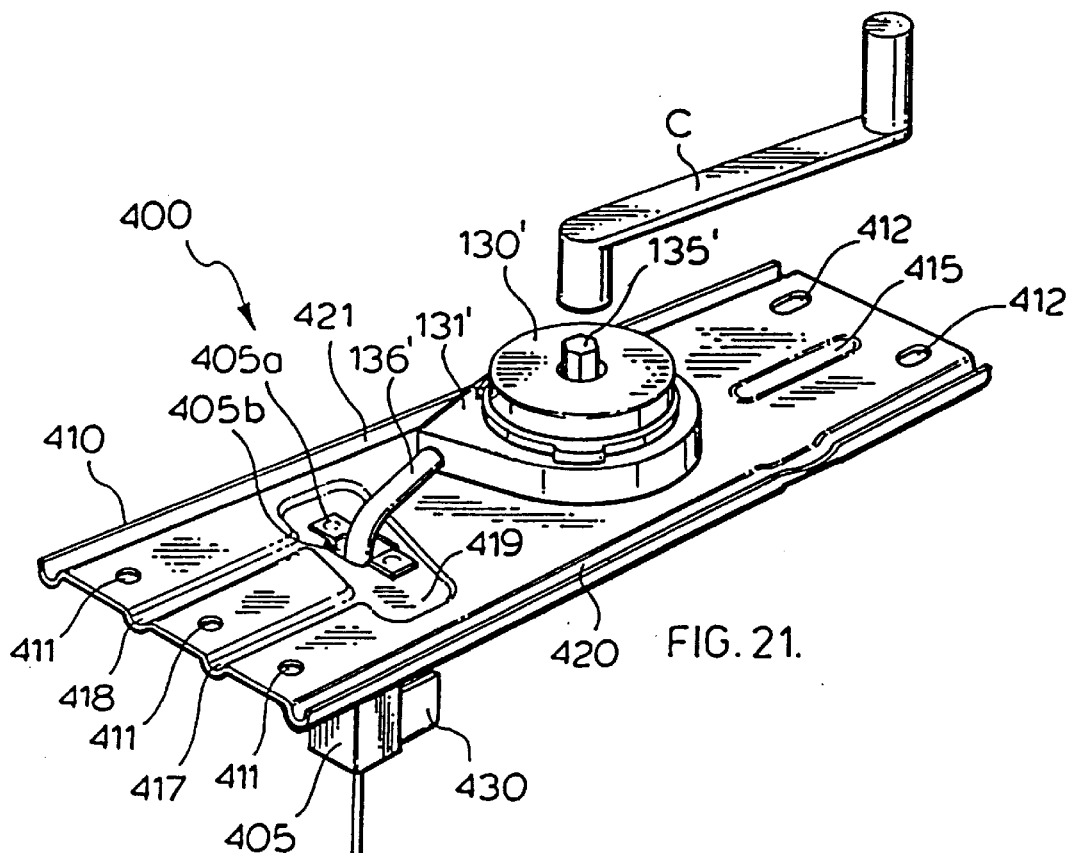
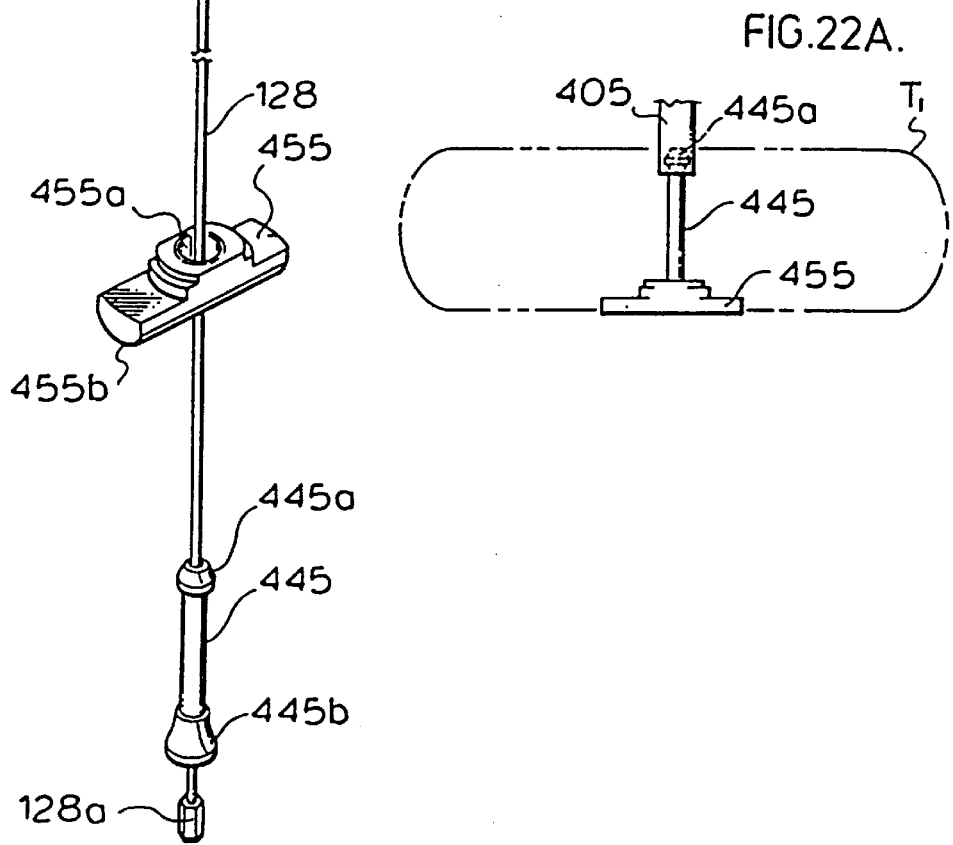

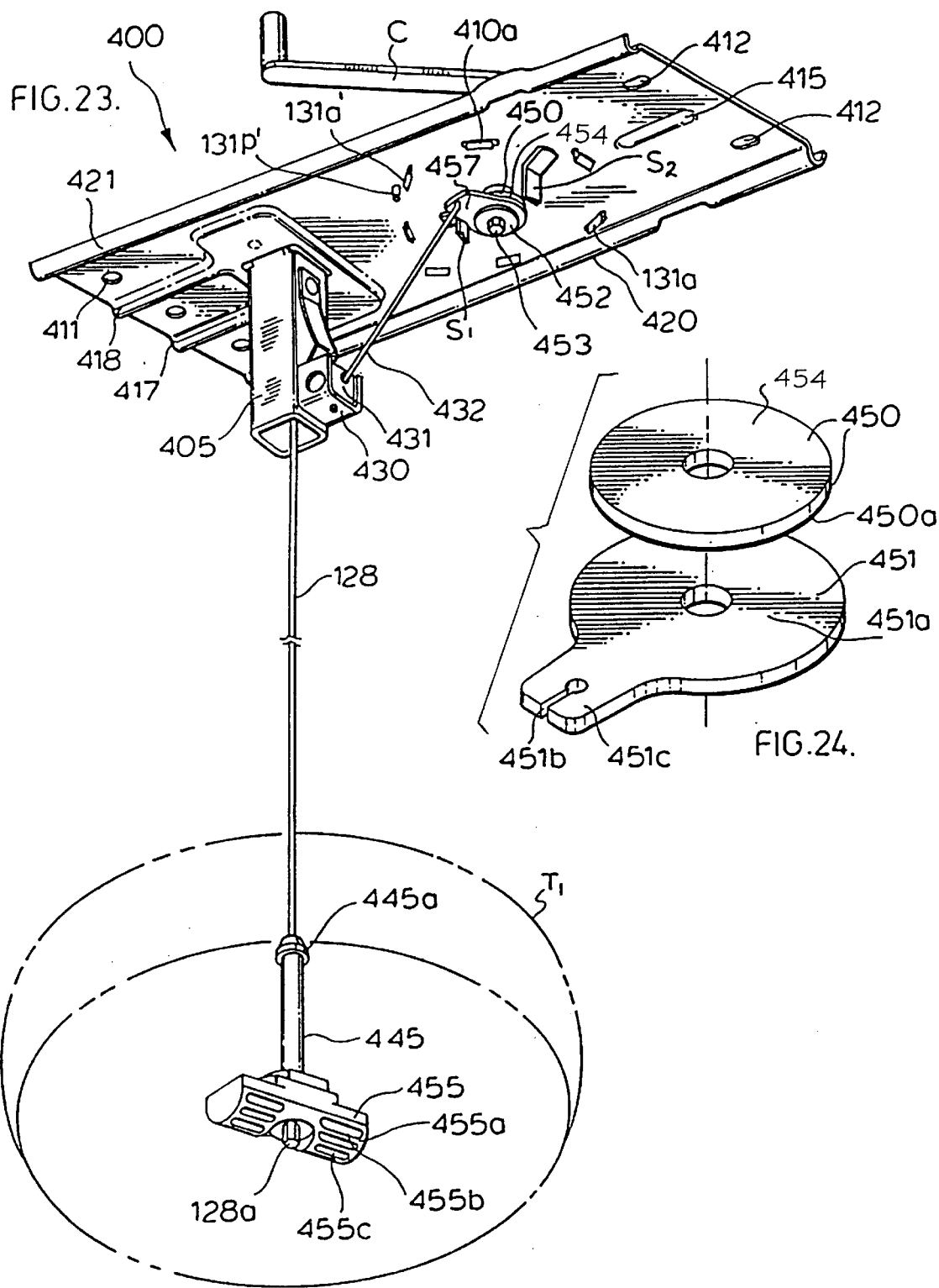

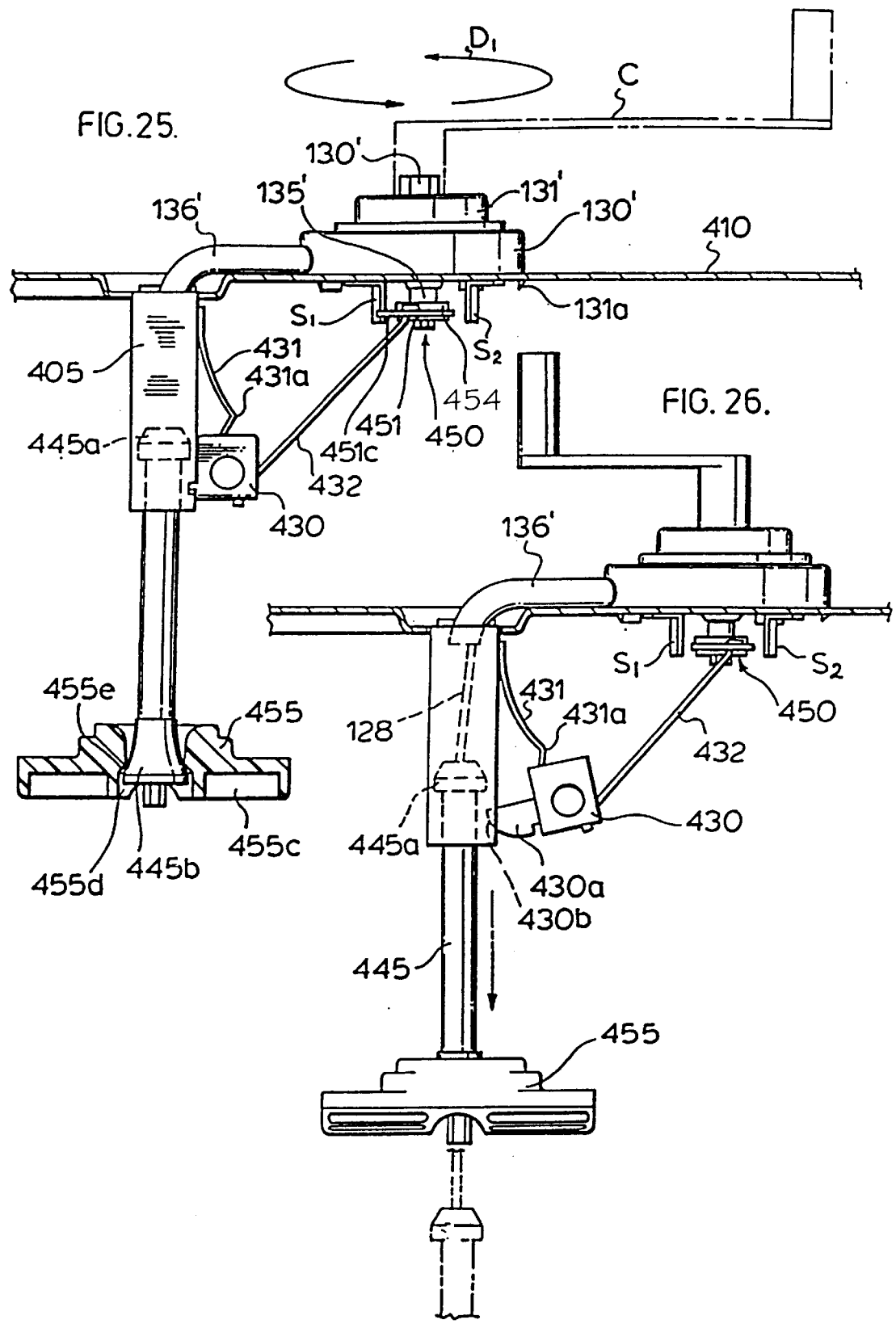

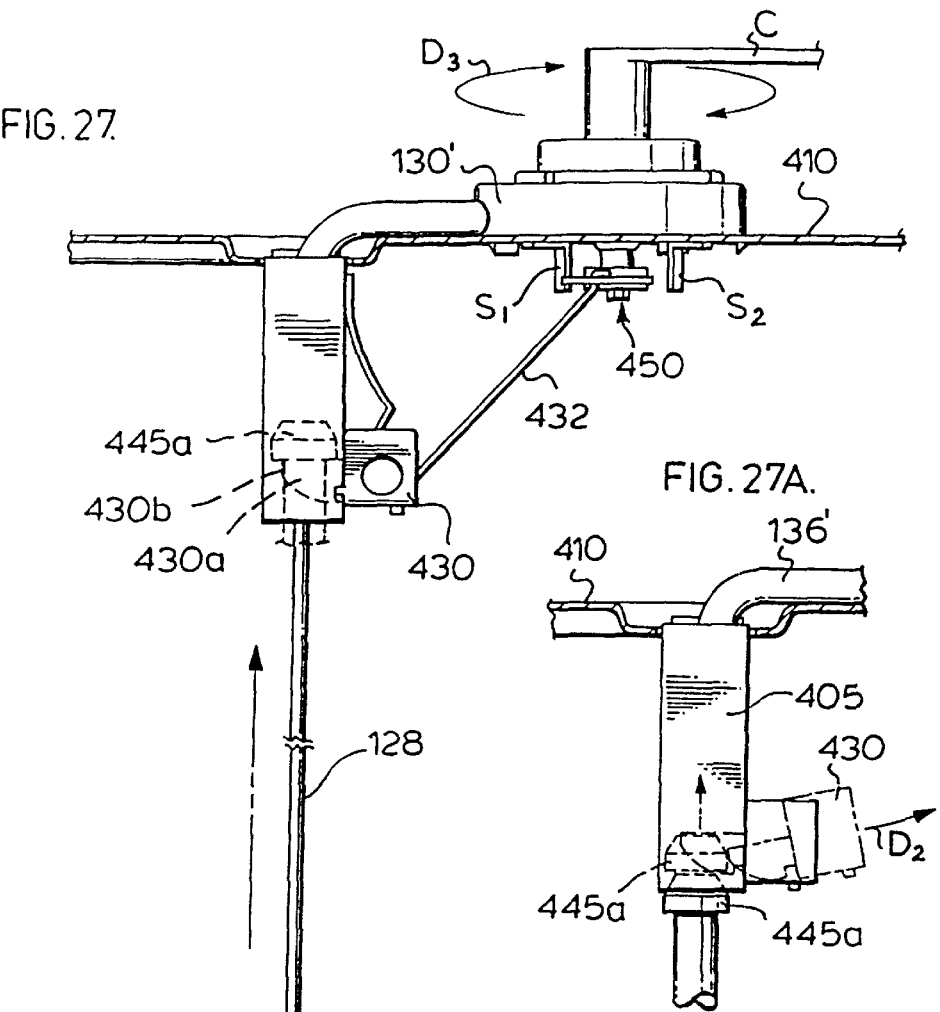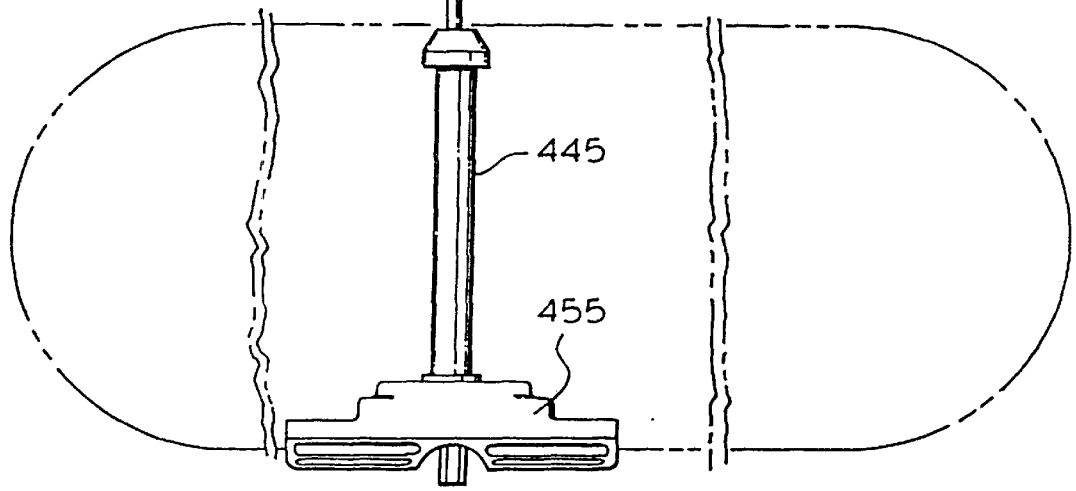

SAFETY LATCH FOR A TIRE CARRIER AND IMPROVEMENTS THEREFOR

This application is a continuation of U.S. patent application Ser. No. 08/871,142, filed Jun. 6, 1997, which is a Divisional of U.S. patent application Ser. No. 08/503,241, filed Jul. 17, 1995, now U.S. Pat. No. 6,092,790, which is a continuation in part of U.S. patent application Ser. No. 07/956,999, filed Oct. 6, 1992, now U.S. Pat. No. 6,390,452, which is a continuation in part of U.S. patent application Ser. No. 07/639,542 filed Jan. 10, 1991, now U.S. Pat. No. 5,188,341.

FIELD OF INVENTION

This invention relates to safety devices which maintain a load in a retained position. More specifically this invention finds application for tires which are stored under a vehicle, having been raised to that position by a tire winch, which includes letting out and reeling in a resilient flexible member such as a cable to move the tire from a lowered position to a stored position. A safety device is therefor provided, which ensures the tire remains in the stored position should the resilient member break. This application also relates to embodiments of a rotary actuator which in a preferred embodiment is embodied with the winch

BACKGROUND OF THE INVENTION

A great number of devices exists which raise and lower a load, and specifically a spare tire from a stored position underneath a vehicle to a lowered position for access by an individual. Conventionally the tire carrier may be pinned to the frame by nut and bolt or the like to retain the tire in a raised position, should a resilient member break.

U.S. Pat. No. 3,856,167 to Kabushiki Kaisha, describes an improved holding device for a spare tire which includes a tire carrier portion suspended from a chain so that a tire is retained in a stored position and is locked in position. The release of the lock is actuated by the rotation of the shaft 9 which causes the disengagement of the lever from the groove of the wheel support member. Therefore rotation of the operating shaft in the appropriate direction is what is required to raise and lower the spare wheel. Further the assembly of the aforementioned device is quite heavy and cumbersome in operation as best seen in FIGS. 3, 4, 9 and 10 thereof. The '167 patent, provides a pawl or spring steel spring 19 which prevents the rotation of the ratchet wheel, as seen in FIG. 2, 6 (a, b), and 7, wherein member 19 forcibly engages the peripheral edge of the ratchet wheel 5 and prevents the rotation of the wheel in the direction which causes release of the chain.

It would therefore be advantageous in one aspect of the invention to provide a positive locking of the wheel in position which is less complicated and in one embodiment is not dependent upon the rotation of the shaft, and the mechanical reliability of all of the interrelated components, which are required for such a mechanism to work. It would also be advantageous to simplify the '167 structure considerably so as to provide a simple device which upon rotation of the winch handle releases the locking device in a positive manner.

Nowhere within the prior art is there found a latch which is released upon rotation of the cranking device using a member which releases the latch upon rotation of the cranking mechanism in a much simplified manner than presently known devices.

U.S. Pat. No. 4,884,785 to Deuer Manufacturing describes a securing mechanism for a spare tire which is normally disengaged from the carrier of the tire when the tire is in the raised position. Should the cable break locking pins are urged to engage the tire carrier and hold it in a raised position so the tire is not lost. This mechanism includes locking pins which are urged outwardly by springs. Should salt spray over a number of years degrade the quality of response of these pins, it is possible that the device may fail just when it is most needed.

Heretofore it has been known to provide separate mounting plates for winch and tire carrier assemblies spaced from one another for mounting (for example welding) to separate reinforcing members of the vehicle. As best as is known, nowhere is there provided a single mounting member for a winch and tire carrier assembly supplied with the winch assembly which obviates the need to provide the aforementioned reinforcing members with the vehicle proximate the mounting location, thus providing both functions with the mounting member of the winch and tire carrier assembly.

It is known to provide a carrier for a tire in a tire winch assembly at the free end of the flexible member with the other end being engaged with a winch reel. Many manufacturers provide winches in various models of their trucks and vans which vehicles have varying tire sizes. It would therefore be beneficial to provide a carrier which is adaptable to receive several sizes of tires therewith for use with a winch assembly.

It is a further object of this invention to provide a safety device for a load carrier which is engaged at all times when the carrier is in the raised position.

It is a further object of this invention to provide a safety device for a load carrier which is easy to use and is reliable.

It is a further object of this invention to provide a mounting member for the winch assembly with the winch assembly which fastens in place directly to the supporting members of the vehicle.

It is yet another object of the invention to provide a mounting member for a winch assembly supplied with the winch assembly which obviates the need to provide mounting members within the vehicle, thus providing both functions with the mounting member of the winch assembly.

It is a further object of an improvement to the invention to provide a rotary actuator which controls an operating device for a remote mechanism and which operation of the actuator device moves the operating mechanism. Preferably the actuator is embodied with a winch mechanism as an add on component thereof or as an integral part thereof It is yet another object of the invention to provide a carrier which is adaptable to receive several sizes of tires therewith for use with a winch assembly.

Further and other objects of this invention will become apparent to a man skilled in the art when considering the following summary of the invention and the more detailed description of the preferred embodiments illustrated herein.

SUMMARY OF THE INVENTION

This invention provides a safety mechanism for a winch assembly when storing a load, such as a tire under a vehicle or a boat on a trailer, in a raised or stored position. The invention finds particular application to a spare tire, but those skilled in the art will appreciate the broader benefits of such a structure when used with a winch assembly for other uses such as a boat winch for a trailer or any analogous use wherein it is desirable to secure a load in the raised or stored position.

According to one aspect of the invention there is provided a safety device for a winch assembly, preferably for a spare tire storage assembly, the assembly including a winch affixed by mounting means proximate a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising a carrier and preferably a tire carrier for carrying the load, for example the preferred spare tire installed on the hub, the carrier including a first portion and a second portion, the first portion for supporting the load, the preferred tire installed on a hub, and the second portion being integral with the first portion and affixed with the other end of the member remote the winch, the second portion of the carrier including a detent portion, (preferably a shoulder), the safety device having engaging means for said handle means, the engaging means for said handle means being affixed with the mounting means proximate the winch and having a preferably hollow portion, the preferably hollow portion of the engaging means having lever means associated therewith, the lever means being movably affixed with respect to the mounting means, the safety device having resiliently biased latching means movably affixed with respect to the mounting means, the lever means being interconnected with the latching means and being moveable from a first position when the handle means does not engage the engaging means to a second position whereat the handle means engages the engaging means, the latching means having detent means disposed therewith and moveable with the latching means by the lever means from a third position whereat the load, for example the preferred spare tire, is in the locked position, and the detent means of the latching means engages the detent means of the second portion of the carrier to latch the carrier in the stored position and preclude the loss of the load should the member break, to a fourth position whereat the load, for example the preferred spare tire installed on a hub, is unlatched and free to move by the letting out or taking up of the member by the operation of the winch to and from the accessible position.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising a tire carrier for carrying the spare tire installed on the hub, the carrier including a first portion for insertion within an opening in the hub and abutting the bottom of the hub, and a second shank portion having two ends and being affixed to the first portion proximate one end and having an expanded head proximate the other end, the first portion for supporting the spare tire installed on a hub, and the second shank portion being integral with the first portion and being affixed to the other end of the cable remote the winch proximate the head of the second shank portion, the head of the second shank portion of the carrier including a shoulder adjacent the shank portion, the safety device having a preferably hollow portion for engaging said handle, the preferably hollow portion being affixed with a mounting bracket proximate the winch, the preferably hollow portion having a lever associated therewith, preferably the lever including a cam surface for engaging the handle, the lever being movably affixed with respect to a mounting bracket, the safety device having a resiliently biased pawl movably affixed with respect to a mounting bracket, the lever being interconnected with the pawl and the lever being moveable from a first position when the handle does not engage the lever and preferably the cam surface thereof to a second position whereat the handle means engages the lever and moves the lever to the second position, the pawl having at least one finger and preferably two disposed therewith and moveable with the pawl by the lever from a third position whereat the spare tire is in the locked position, and the at least one finger of the pawl engages under the shoulder of the head of the second shank portion of the tire carrier to latch the tire carrier in the stored position and preclude the loss of the tire should the cable break, to a fourth position whereat the spare tire installed on a hub is unlatched and free to move by the letting out or taking up of the cable to and from the accessible position by the operation of the winch.

According to yet another aspect of the invention there is provided a safety device for a winch assembly, preferably for a spare tire storage assembly, the assembly including a winch having a housing and affixed by mounting means near a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising in use a carrier and preferably a tire carrier for carrying the load, for example the preferred spare tire installed on the hub, the carrier including a first portion and a second portion, the first portion for supporting the load, the preferred tire installed on a hub, and the second portion being disposed with the first portion in use and engaged in use with the other end of the member remote the winch, the second portion of the carrier including a detent portion, (preferably a shoulder), the safety device being moveable and preferably rotatable by rotation of said handle means when said winch is rotated and including an actuating member preferably for converting rotary motion to substantially linear motion, the actuating member in one embodiment being disposed within the winch housing and in another embodiment being engageable with said winch preferably proximate one side thereof remote said handle means in use, preferably a disk shaped member, the actuating member having disposed therewith control means, preferably disposed proximate a first side thereof, and preferably at least one spiral path, the control means of the actuating member for engagement in use with operating means of said safety device, the operating means having detent means associated with the control means of said actuating member in use and for controlling the motion of said operating means when the winch is rotated (preferably said operating means being a rod having two ends, the first end for engagement with the control means of said actuating member and preferably with the spiral path thereof, and the second end for operating the safety device and in one embodiment the rod operating lever means associated with the safety device), the operating means (and the preferred rod) being movably affixed with respect to the assembly, the safety device having preferably resiliently biased latching means movably affixed with respect to the assembly, the operating means (and in one embodiment the lever means) being interconnected with the latching means and being moveable by the actuating member and the control means thereof, in engagement with said detent means of said operating means, from a first position when the winch is not operated and the load is in the stored position, to a second position when the winch is operated and the load is being moved from the stored position, the latching means having detent means disposed therewith and moveable with the latching means by the operating means (and in one embodiment the lever means) from a third position whereat the load, for example the preferred spare tire, is in the locked position when the winch is not operated, and the detent means of the latching means engages the detent means of the second portion of the carrier to latch the carrier in the stored position and preclude the loss of the load should the member break, to a fourth position whereat the load, for example the preferred spare tire installed on a hub, is unlatched and free to move by the letting out or taking up of the member by the operation of the winch to and from the accessible position.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising in use a tire carrier for carrying the spare tire installed on the hub, the carrier including a first portion for insertion within an opening in the hub and preferably abutting the bottom of the hub, and a second shank portion having two ends and being engaged with the first portion proximate one end and having an expanded head proximate the other end, the first portion for supporting the spare tire installed on a hub, and the second shank portion being engaged with the first portion and being engaged with the other end of the cable remote the winch proximate the head of the second shank portion, the head of the second shank portion of the carrier including a shoulder adjacent the shank portion, the safety device being moveable and preferably rotatable by rotation of said handle when said winch is rotated and including an actuating member preferably for converting rotary motion to substantially linear motion, the actuating member in one embodiment being disposed within the winch housing and in another embodiment being engageable with said winch preferably proximate one side thereof remote said handle in use, preferably a disk shaped member, the actuating member having disposed therewith at least one preferably spiral link control path having a first and second end, preferably the first end of the link control path being disposed proximate the centre of the actuating member and the second end of the link control path being disposed proximate the perimeter of the actuating member, preferably the link control path being disposed proximate a first side of the actuating member remote said handle in use, the link control path of the actuating member for engagement in use with an operating link of said safety device to move said operating link and operate said safety device, the operating link (preferably said operating link being a rod) having two ends, one end thereof associated with the link control path of said actuating member in use and for controlling the motion of said operating link when the winch is rotated and the second end for operating the safety device (and in one embodiment the rod operating lever means associated with the safety device), the operating link being movably affixed with respect to the assembly, the safety device having a resiliently biased pawl movably affixed with respect to a mounting bracket, the operating link being interconnected with the pawl and being moveable from a first position when the handle does not rotate the winch whereat the end of the operating link engaging the link control path of the actuating member is proximate the first end of the link control path, to a second position whereat the handle rotates the winch and the end of the operating link engaging the link control path of the actuating member is proximate the second end of the link control path, the pawl having at least one finger, and preferably two disposed therewith, and moveable with the pawl by the motion of the operating link from a third position whereat the spare tire is in the locked position, and the at least one finger of the pawl engages under the shoulder of the head of the second shank portion of the tire carrier to latch the tire carrier in the stored position and preclude the loss of the tire should the cable break, to a fourth position whereat the spare tire installed on a hub is unlatched and free to move by the letting out or taking up of the cable to and from the accessible position by the operation of the winch.

In a preferred embodiment the detent means and the preferred at least one finger of the latching means and the preferred pawl has disposed therewith cam surfaces to engage the second portion of the carrier when the load is moved from the accessible position to the stored position to ensure proper positioning of the detent or finger of the latch with respect to the detent of the second portion of the carrier when the load is moved to the stored position.

According to yet another aspect of the invention there is provided an actuating member and preferably a disk shaped member, for converting rotary motion to substantially linear motion, preferably in one embodiment being disposed within a winch housing and preferably in another embodiment being engageable with said winch, the actuating member having disposed therewith control means, preferably disposed proximate a first side thereof, and preferably at least one spiral path, the control means of the actuating member for engagement in use with operating means of at least a two operating position device, the operating means having detent means associated with the control means of said actuating member in use and for controlling the motion of said operating means when the actuating member is rotated (preferably said operating means being a rod having two ends, the first end for engagement with the control means of said actuating member and preferably with the spiral path thereof, and the second end for operating the at least two operating position device, and in one embodiment the rod operating lever means associated with the device), the operating means (and the preferred rod) being movably affixed with respect to the at least two operating position device, the at least two operating position device having actuated means movably affixed with respect to the assembly, the operating means (and in one embodiment the lever means) being interconnected with the actuated means and being moveable by the actuating member and the control means thereof, in engagement with said detent means of said operating means, from a first position when the actuating means is not operated, to a second position when the actuating means is operated.

According to yet another aspect of the invention there is provided an actuating member for converting rotary motion to substantially linear motion, preferably the actuating member in one embodiment being disposed within a winch housing and in another embodiment being engageable with said winch, the actuating member preferably a disk shaped member having disposed therewith at least one link control path (preferably spiral) having a first and second end, preferably the first end of the link control path being disposed proximate the centre of the actuating member and the second end of the link control path being disposed proximate the perimeter of the actuating member, preferably the link control path being disposed proximate a first side of the actuating member, the link control path of the actuating member for engagement in use with an operating link of said an at least two operating position device to move said operating link and operate said at least two operating position device, the operating link (preferably said operating link being a rod) having two ends, one end thereof associated with the link control path of said actuating member in use and for controlling the motion of said operating link when the actuating member is rotated and the second end for operating the at least two operating position device (and in one embodiment the rod operating lever means associated with the at least two operating position device), the operating link being movably affixed with respect to the assembly, the at least two operating position device having actuated means movably affixed with respect to the assembly, the operating link being interconnected with the actuated means and being moveable from a first position whereat the end of the operating link engaging the link control path of the actuating member is proximate the first end of the link control path, to a second position whereat the actuating member rotates and the end of the operating link engaging the link control path of the actuating member is proximate the second end of the link control path, thus moving the at least two operating position device to and from its operating positions.

According to yet another aspect of the invention the aforementioned safety devices and specifically the winch therefor may further comprise an annular raised portion on the housing of the winch for engaging and locking with a supplementary housing containing a torque limiting device operable with said winch.

According to yet another aspect of the invention the aforementioned actuators, safety devices and specifically the winch therefor may further comprise an actuator comprising a disk shaped member of thermoplastic material with an opening provided therewith for the fastening of the actuator in position in use and having substantially arcuate spiral paths provided therewith to control the motion of a rod end, the paths being defined between two substantially spiral shaped raised portions which include a centre broad portion and flexible tapered flange portions proximate the ends of the raised portions, and a raised ring about the perimeter of said member, the raised portions therefore control the rod end there between as the actuator is rotated.

According to yet another aspect of the invention there is provided a clip on torque limiting unit comprising a first housing containing a torque limiting unit and having a portion which fastens in use with the side of a second housing containing a winch, said second housing having portions which act as clips to fasten with the portion of the first housing of the torque limiting unit, the first housing and the torque limiting unit thereof being aligned in use so as to engage the end of a drive means of the winch of the second housing when the first housing is clipped in position when the portion of the first housing is fastened with the clips of the second housing.

According to yet another aspect of the invention there is provided a clip on torque limiting unit comprising a torque limiting member which is for joining to a winch housing as a supplementary member contained in a first housing and utilizing one side of the winch housing acting as a backing plate for the first housing to retain the torque limiting member in use, the torque limiting member including first and second torque limiting plates having means disposed upon contacting surfaces and a spring means to ensure the engagement of the means disposed upon the contacting surfaces of the first and second plates, one of the plates also including a nut portion for engagement with a handle in use, the other plate including means for engaging a drive mechanism of a winch in use, wherein the torque limiting plates at a predetermined torque slip with respect to one another and thus provide overload protection for any winch to which the torque limiting unit may be attached.

According to yet another aspect of the invention there is provided a torque limiting unit for inclusion with a winch assembly, the torque limiting unit including first and second torque limiting plates having means disposed upon contacting surfaces and a spring means to ensure the engagement of the means disposed upon the contacting surfaces of the first and second plates, one of the plates also including a nut portion for engagement with a handle in use, the other plate including means for engaging a drive mechanism of a winch in use, wherein the torque limiting plates, at a predetermined torque, slip with respect to one another and thus provide overload protection for any winch to which the torque limiting unit may be attached or installed.

According to yet another aspect of the invention there is provided a torque limiting device for a winch comprising a portion on the housing of the winch for engaging and locking with a supplementary housing containing torque limiting components operable with said winch, the supplementary housing and the winch housing containing the torque limiting components therebetween when assembled.

According to yet another aspect of the invention there is provided a safety device for a winch assembly, the assembly including a winch having a housing containing a winch reel, the winch being affixed by mounting means near a stored position for a load, the winch reel by the operation of handle means and an accessible drive shaft lets out and takes up a length of a member affixed at one end to the winch reel, wherein letting out and taking up of the member moves the load from a locked stored position to an unlocked accessible position remote the stored position, a carrier for carrying the load, the carrier including a first portion and a second portion, the first portion for supporting the load, and the second portion being disposed with the first portion in use and engaged in use with the other end of the member remote the winch, the second portion of the carrier including a first detent means, the safety device being moveable by rotation of said handle means when said winch reel is rotated, the safety device comprising an actuating member rotatable by rotation of said handle when said winch reel is rotated, the actuating member being engaged with the drive shaft of said winch reel and having disposed therewith a control for an operating means, the control for the operating means of the actuating member for engagement in use with the operating means of said safety device, the operating means having detent means associated with the control of the operating means of said rotatable actuating member in use and for controlling the motion of said operating means when the winch reel is rotated, the safety device having latching means movably affixed with respect to the assembly, the operating means being interconnected with the latching means and being moveable by the rotatable actuating member and the control for the operating means thereof in engagement with said detent means of said operating means, from a first position when the winch reel is not operated and the load is in the stored position, to a second position when the winch reel is operated and the load is being moved from the stored position, the latching means having second detent means disposed therewith and moveable with the latching means by the operating means from a third position whereat the load is in the locked position when the winch is not operated, and the second detent means of the latching means engages the first detent means of the second portion of the carrier to latch the carrier in the stored position and preclude the loss of the load should the member break, to a fourth position whereat the load is unlatched and free to move by the letting out or taking up of the member by the operation of the winch to and from the accessible position.

According to yet another aspect of the invention there is provided a rotatable actuating member for converting rotary motion to a latching/unlatching motion, the rotatable actuating member comprising a control, the control for engagement in use with an operating means of at least a two operating position device, the rotatable actuating member being, engaged with and being rotatable with a drive of the at least a two operating position device, the operating means having detent means associated with the control of said actuating member in use and for effecting the motion of said operating means when the rotatable actuating member is rotated, the operating means being movably affixed with respect to the at least two operating position device, the at least two operating position device having actuated means movably affixed with respect thereto, the operating means being interconnected with the actuated means and being moveable by the rotatable actuating member and the control in engagement with said detent means of said operating means, from a first position when the actuated means is not moved, to a second position when the actuated means is moved.

According to yet another aspect of the invention there is provided a safety device for a winch assembly, the assembly including a winch having a housing containing a winch reel, the winch being affixed by mounting means near a stored position for a load, the winch reel by the operation of a handle and an accessible drive shaft lets out and takes up a length of a member affixed at one end to the winch reel, wherein letting out and taking up of the member moves the load from a locked stored position to an unlocked accessible position remote the stored position, a carrier for carrying the load, the carrier including a first portion and a second portion, the first portion for supporting the load, and the second portion being disposed with the first portion in use and engaged in use with the other end of the member remote the winch, the second portion of the carrier including a first detent, the safety device being moveable by rotation of said handle when said winch reel is rotated, the safety device comprising an actuating member rotatable by rotation of said handle when said winch reel is rotated, the actuating member being engaged with the drive shaft of said winch reel and having disposed therewith a control, the control of the actuating member for engagement in use with an operator of said safety device, the operator having a detent associated with the control of said rotatable actuating member in use and for controlling the motion of said operator when the winch reel is rotated, the safety device having a latch movably affixed with respect to the assembly, the operator being interconnected with the latch and being moveable by the rotatable actuating member and the control thereof in engagement with said detent of said operator, from a first position when the winch reel is not operated and the load is in the stored position, to a second position when the winch reel is operated and the load is being moved from the stored position, the latch having a second detent disposed therewith and moveable with the latch by the operator from a third position whereat the load is in the locked position when the winch is not operated, and the second detent of the latch engages the first detent of the second portion of the carrier to latch the carrier in the stored position and preclude the loss of the load should the member break, to a fourth position whereat the load is unlatched and free to move by the letting out or taking up of the member by the operation of the winch to and from the accessible position.

According to yet another aspect of the invention there is provided a rotatable actuating member for converting rotary motion to a latching/unlatching motion, the rotatable actuating member comprising a control, the control for engagement in use with an operator of at least a two operating position device, the rotatable actuating member being, engaged with and being rotatable with a drive of the at least a two operating position device, the operator having a detent associated with the control of said actuating member in use and for effecting the motion of said operator when the rotatable actuating member is rotated, the operator being movably affixed with respect to the at least two operating position device, the at least two operating position device having a latch movably affixed with respect thereto, the operator being interconnected with the latch and being moveable by the rotatable actuating member and the control in engagement with said detent of said operator, from a first position when the latch is not moved, to a second position when the latch is moved.

According to yet another aspect of the invention there is provided a winch assembly comprising a winch for letting out and taking up a flexible member and for moving a load from a stored position to an accessible position, a mounting bracket having a top and a bottom and having affixed thereto a latch tube extending away from the bottom of the mounting bracket and for guiding the flexible member and the load to and from the stored position, said latch tube having affixed therewith a biased latch moveable away from and toward said latch tube, said latch having a first detent provided therewith, the winch assembly having a carrier for carrying the load and engaged with the flexible member, the carrier having disposed therewith a second detent, wherein when said load is moved to the stored position the first detent of the latch provided with the latch tube is positioned with respect to the second detent of the carrier to prevent loss of the load, thus ensuring that should the flexible member break that the latch will retain the load proximate the stored position.

According to yet another aspect of the invention there is provided a carrier for a tire comprising a tube having a first and second end and having an opening extending from the first end to the second end, the tube having an enlarged head disposed proximate said first end of the tube and having a flared flanged end disposed proximate the second end of the tube, the enlarged end of the tube including a detent for engagement with a latch of a winch assembly in use, the carrier having a wheel retaining portion providing a base upon which the tire will rest in use (and preferably adapted to carry multiple sizes of tires), said base including an opening extending there through which said tube is inserted from the first end to the second end, said opening of said wheel retainer being large enough to receive the first end of the tube but will not allow the second end to pass, preferably the bottom of said wheel retainer being substantially hollow and having disposed within the hollow reinforcing ribs to rigidify the wheel retainer, the tube in use having a flexible member extending there through with a retaining nut provided proximate the end of the flexible member in use and disposed adjacent the opening of the second end of the tube to prevent pulling the flexible member through the tube in use, wherein said carrier is adapted to retain a spare tire in a winch assembly and to readily release the spare tire from the carrier for user access, (for example in the separation of the tube and carrier during release of the tire).

According to yet another aspect of the invention there is provided a winch assembly comprising a single mounting bracket for mounting the winch assembly directly to a frame (for example beams) of a vehicle having a front and rear, the mounting bracket having a winch mounting area provided therewith, a tire carrier and cooperative flexible member outlet area spaced from the winch mounting area towards the front of the vehicle, the mounting bracket being adapted to bolt directly to the frame members (for example beams) of a vehicle, wherein the mounting bracket for the winch obviates the need to provide welded or fastened reinforcing plates with the vehicle proximate the locations wherein the winch assembly is to be mounted.

According to yet another aspect of the invention there is provided for use in a winch assembly affixed to a vehicle via a mounting bracket, a winch housing comprising the operating parts of the winch in use, the mounting bracket providing a closure for the winch housing and the winch components, the mounting bracket having disposed therewith a plurality of openings, said winch housing having provided therewith clip portions which are sufficiently flexible to compress or tense when inserted within the openings of the mounting bracket to thereby retain the winch housing and therefore the winch in a predetermined location with the winch assembly.

According to yet another aspect of the invention there is provided a winch assembly comprising a mounting bracket for mounting the winch assembly to a vehicle, a winch housing containing the operating parts of the winch in use, the mounting bracket providing a closure for the winch housing and the winch components, the mounting bracket having disposed therewith a plurality of openings, said winch housing having provided therewith clip portions which are sufficiently flexible to compress or tense when inserted within the openings of the mounting bracket to thereby retain the winch housing and therefore the winch in a predetermined location with the winch assembly.

According to yet another aspect of the invention there is provided a mounting member for use in mounting a tire winch and compatible tire carrier under a vehicle, the mounting member comprising a single mounting plate adapted to carry the tire winch proximate a first predetermined location and the tire carrier proximate a second predetermined location, wherein the winch and as result of the operation of the winch a tire is accessible to a user, the mounting plate being adapted to be bolted directly to the frame members (for example the beams) of the under carriage of the vehicle and thereat supporting and positioning the winch and the tire carrier, wherein said single mounting plate obviates the need to provide reinforcing plates with the vehicle proximate the location wherein the winch and tire carrier would be mounted.

According to yet another aspect of the invention there is provided a rotatable actuating mechanism for converting rotary motion to a latching unlatching motion, the rotatable actuating mechanism comprising a first member and a second member, the second member including a first detent, the first detent for engagement in use with an operator of at least a two operating position device such as a tire winch assembly, the operator having a second detent provided therewith and in communication with the first detent of the second member, the at least two operating position device having a resiliently biased latch movably affixed with respect thereto and biased to a latched position, the operator also being interconnected with the latch and being movable by the rotatable actuating member and the first detent of the second member from a first latched position wherein the latch is latched to a second unlatched position wherein the latch is unlatched , the first and second members having frictionally engaging faces engaging one another, wherein when the actuating mechanism is rotated the first member rotates, wherein rotation of the first member therefore due to friction rotates the second member up to a predetermined limit established by the movement of the operator and the first detent of the second member engaging a first stop provided adjacent the actuating mechanism, whereat above said predetermined limit said first member will slip in relation to said second member thus continuing the motion of the first member but limiting the motion of the second member allowing for, in the case of a winch assembly the paying out of a flexible member following the release of the latch, wherein rotation of the first member in a second direction opposite the first direction therefore rotates the second member up to a predetermined limit established by a second stop provided adjacent the actuating mechanism whereat at said predetermined limit said first member will slip in relation to said second member thus continuing the motion of the first member allowing for example in the case of a winch assembly the taking up of a flexible member on the winch until the latch is latched, but limiting the motion of the second member, the second member being limited in the first direction by the first stop and being limited in the second direction by the second stop wherein the first member will continue to rotate in both directions during the operation of the winch According to yet another aspect of the invention there is provided a safety device for a winch assembly, preferably for a spare tire storage assembly, the assembly including a winch having a housing and affixed by mounting means near a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising in use a carrier and preferably a tire carrier for carrying the load, for example the preferred spare tire installed on the hub, the carrier including a first portion and a second portion, the first portion for supporting the load, the preferred tire installed on a hub, and the second portion being disposed with the first portion in use and engaged in use with the other end of the member remote the winch, the second portion of the carrier including a detent portion, (preferably a shoulder), the safety device being moveable and preferably rotatable by rotation of said handle means when said winch is rotated and including an actuating member preferably for converting rotary motion to substantially linear motion, the rotatable actuating mechanism comprising a first member and a second member, the second member including a first detent, the first detent for engagement in use with an operator of the winch assembly, he operator having a second detent provided therewith and in communication with the first detent of the second member, the at least two operating position device having a resiliently biased latch movably affixed with respect thereto and biased to a latched position, the operator also being interconnected with the latch and being movable by the rotatable actuating member and the first detent of the second member from a first latched position wherein the latch is latched to a second unlatched position wherein the latch is unlatched, the first and second members having frictionally engaging faces engaging one another, wherein when the actuating mechanism is rotated the first member rotates, wherein rotation of the first member therefore due to friction rotates the second member up to a predetermined limit established by the movement of the operator and the first detent of the second member engaging a first stop provided adjacent the actuating mechanism, whereat above said predetermined is limit said first member will slip in relation to said second member thus continuing the motion of the first member but limiting the motion of the second member allowing for the paying out of a flexible member following the release of the latch, wherein rotation of the first member in a second direction opposite the first direction therefore rotates the second member up to a predetermined limit established by a second stop provided adjacent the actuating mechanism whereat at said predetermined limit said first member will slip in relation to said second member thus continuing the motion of the first member allowing for the taking up of a flexible member on the winch until the latch is latched, but limiting the motion of the second member, the second member being limited in the first direction by the first stop and being limited in the second direction by the second stop wherein the first member will continue to rotate in both directions during the operation of the winch.

According to another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising in use a tire carrier for carrying the spare tire installed on the hub, the carrier including a first portion for insertion within an opening in the hub and preferably abutting the bottom of the hub, and a second shank portion having two ends and being engaged with the first portion proximate one end and having an expanded head proximate the other end, the first portion for supporting the spare tire installed on a hub, and the second shank portion being engaged with the first portion and being engaged with the other end of the cable remote the winch proximate the head of the second shank portion, the head of the second shank portion of the carrier including a shoulder adjacent the shank portion, the safety device being rotatable by rotation of said handle when said winch is rotated and including an actuating member for converting rotary motion to substantially linear motion, the actuating member being engageable with said winch proximate one side thereof remote said handle in use, the rotatable actuating mechanism comprising a first member and a second member, the second member including a first detent, the first detent for engagement in use with an operator of the tire winch assembly, the operator having a second detent provided therewith and in communication with the first detent of the second member, the winch having a resiliently biased latch movably affixed with respect thereto and biased to a latched position, the operator also being interconnected with the latch and being movable by the rotatable actuating member and the first detent of the second member from a first latched position wherein the latch is latched to a second unlatched position wherein the latch is unlatched, the first and second members having frictionally engaging faces engaging one another, wherein when the actuating mechanism is rotated the first member rotates, wherein rotation of the first member therefore due to friction rotates the second member up to a predetermined limit established by the movement of the operator and the first detent of the second member engaging a first stop provided adjacent the actuating mechanism, whereat above said predetermined limit said first member will slip in relation to said second member thus continuing the motion of the first member but limiting the motion of the second member allowing for the paying out of a flexible member following the release of the latch, wherein rotation of the first member in a second direction opposite the first direction therefore rotates the second member up to a predetermined limit established by a second stop provided adjacent the actuating mechanism whereat at said predetermined limit said first member will slip in relation to said second member thus continuing the motion of the first member allowing the taking up of a flexible member on the winch until the latch is latched, but limiting the motion of the second member, the second member being limited in the first direction by the first stop and being limited in the second direction by the second stop wherein the first member will continue to rotate in both directions during the operation of the winch.

According to yet another aspect of the invention there is provided a rotatable actuating mechanism rotatable on a drive shaft and for converting rotary motion to a latching unlatching motion, the rotatable actuating mechanism comprising a preferably bifurcated member (preferably formed from a continuous elongated flattened section of spring steel and preferably having a central yoke shaped portion for frictionally engaging the drive shaft (preferably within a groove preferably of 1 mm depth) and having two legs extending therefrom, both legs for providing a stop feature for the actuator and one of the legs for providing the first detent) and including a first detent and a first and second stop, the first detent for engagement in use with an operator of at least a two operating position device such as a tire winch assembly, the operator having a second detent provided therewith and in communication with the first detent of the bifurcated member, the at least two operating position device having a resiliently biased latch movably affixed with respect thereto and biased to a latched position, the operator also being interconnected with the latch and being movable by the rotatable actuating member and the first detent of the preferably bifurcated member from a first latched position wherein the latch is latched to a second unlatched position wherein the latch is unlatched, the actuating mechanism having a frictionally engaging surface (preferably the inside surface of the central yoke) engageable with the drive shaft, wherein when the drive shaft is rotated the preferably bifurcated member rotates up to a predetermined limit established by the movement of the operator and the first and second stops of the preferably bifurcated member engaging at least a third stop provided adjacent the actuating mechanism, whereat above said predetermined limit said preferably bifurcated member will slip in relation to said drive shaft thus continuing the motion of the drive shaft but limiting the motion of the preferably bifurcated member allowing for, in the case of a winch assembly the paying out of a flexible member following the release of the latch, wherein rotation of the preferably bifurcated member in a second direction opposite the first direction therefore rotates the member up to a predetermined limit established by the at least a third stop provided adjacent the actuating mechanism whereat at said predetermined limit said preferably bifurcated member will slip in relation to said drive shaft thus continuing the motion of the drive shaft allowing for example in the case of a winch assembly the taking up of a flexible member on the winch until the latch is latched, but limiting the motion of the preferably bifurcated member, the preferably bifurcated member being limited in the first direction by the first stop engaging the at least a third stop and being limited in the second direction by the second stop engaging the at least a third stop, wherein the preferably bifurcated member will rotate in both directions during the operation of the drive shaft .

According to yet another aspect of the invention there is provided a safety device for a winch assembly, preferably for a spare tire storage assembly, the assembly including a winch having a drive shaft, a housing and affixed by mounting means near a stored position for a load, for example the preferred spare tire, the winch by the operation of handle means lets out and takes up a length of a member (preferably a cable) affixed at one end to the winch and preferably to a reel thereof, which letting out and taking up of the member moves the load, for example the preferred spare tire, installed on a hub, from a locked stored position, preferably under a vehicle, to an unlocked accessible position remote and preferably below the stored position, the safety device comprising in use a carrier and preferably a tire carrier for carrying the load, for example the preferred spare tire installed on the hub, the carrier including a first portion and a second portion, the first portion for supporting the load, the preferred tire installed on a hub, and the second portion being disposed with the first portion in use and engaged in use with the other end of the member remote the winch, the second portion of the carrier including a detent portion, (preferably a shoulder), the safety device being rotatable by rotation of said handle means when said winch is rotated and including an actuating member preferably for converting rotary motion to substantially linear motion, the rotatable actuating mechanism comprising a preferably bifurcated member (preferably formed from a continuous elongated flattened section of spring steel and preferably having a central yoke shaped portion for frictionally engaging the drive shaft (preferably within a groove preferably of 1 mm depth) and having two legs extending therefrom, both legs for providing a stop feature for the actuator and one of the legs for providing the first detent) and including a first detent and a first and second stop, the first detent for engagement in use with an operator of the winch assembly, the operator having a second detent provided therewith and in communication with the first detent of the preferably bifurcated member, the at least two operating position device having a resiliently biased latch movably affixed with respect thereto and biased to a latched position, the operator also being interconnected with the latch and being movable by the rotatable actuating member and the first detent of the preferably bifurcated member from a first latched position wherein the latch is latched to a second unlatched position wherein the latch is unlatched, the actuating mechanism having a frictionally engaging surface (preferably the inside surface of the central yoke) engageable with the drive shaft, wherein when the drive shaft is rotated the preferably bifurcated member rotates up to a predetermined limit established by the movement of the operator and the first and second stop of the preferably bifurcated member engaging at least a third stop provided adjacent the actuating mechanism, whereat above said predetermined limit said preferably bifurcated member will slip in relation to said drive shaft thus continuing the motion of the drive shaft but limiting the motion of the preferably bifurcated member allowing for the paying out of a flexible member following the release of the latch, wherein rotation of the preferably bifurcated member in a second direction opposite the first direction therefore rotates the member up to a predetermined limit established by the at least a third stop provided adjacent the actuating mechanism whereat at said predetermined limit said preferably bifurcated member will slip in relation to said drive shaft thus continuing the motion of the drive shaft allowing for the taking up of a flexible member on the winch until the latch is latched, but limiting the motion of the preferably bifurcated member, the preferably bifurcated member being limited in the first direction by the first stop engaging the at least a third stop and being limited in the second direction by the second stop engaging the at least a third stop, wherein the preferably bifurcated member will rotate in both directions during the operation of the winch.

According to yet another aspect of the invention there is provided a safety device for a spare tire storage assembly, the assembly including a winch affixed by a mounting bracket adjacent a stored position for the spare tire under a vehicle, the winch by the operation of a separate handle lets out and takes up a length of a cable affixed at one end to the winch and preferably to a reel thereof, which letting out and taking up of the cable moves the spare tire, installed on a hub, from a locked stored position under a vehicle, to an unlocked accessible position below the stored position, the safety device comprising in use a tire carrier for carrying the spare tire installed on the hub, the carrier including a first portion for insertion within an opening in the hub and preferably abutting the bottom of the hub, and a second shank portion having two ends and being engaged with the first portion proximate one end and having an expanded head proximate the other end, the first portion for supporting the spare tire installed on a hub, and the second shank portion being engaged with the first portion and being engaged with the other end of the cable remote the winch proximate the head of the second shank portion, the head of the second shank portion of the carrier including a shoulder adjacent the shank portion, the safety device being rotatable by rotation of said handle when said winch is rotated and including an actuating member for converting rotary motion to substantially linear motion, the actuating member being engageable with said winch proximate one side thereof remote said handle in use, the rotatable actuating mechanism comprising a preferably bifurcated member (preferably formed from a continuous elongated flattened section of spring steel and preferably having a central yoke shaped portion for frictionally engaging the drive shaft (preferably within a groove preferably of 1 mm depth) and having two legs extending therefrom, both legs for providing a stop feature for the actuator and one of the legs for providing the first detent) and including a first detent and a first and second stop, the first detent for engagement in use with an operator of the tire winch assembly, the operator having a second detent provided therewith and in communication with the first detent of the preferably bifurcated member, the winch having a resiliently biased latch movably affixed with respect thereto and biased to a latched position, the operator also being interconnected with the latch and being movable by the rotatable actuating member and the first detent of the preferably bifurcated member from a first latched position wherein the latch is latched to a second unlatched position wherein the latch is unlatched, the actuating mechanism having a frictionally engaging surface (preferably the inside surface of the central yoke) engageable with the drive shaft, wherein when the drive shaft is rotated the preferably bifurcated member rotates up to a predetermined limit established by the movement of the operator and the first and second stop of the preferably bifurcated member engaging at least a third stop provided adjacent the actuating mechanism, whereat above said predetermined limit said preferably bifurcated member will slip in relation to said drive shaft thus continuing the motion of the drive shaft but limiting the motion of the preferably bifurcated member allowing for the paying out of a flexible member following the release of the latch, wherein rotation of the preferably bifurcated member in a second direction opposite the first direction therefore rotates the member up to a predetermined limit established by the at least a third stop provided adjacent the actuating mechanism whereat at said predetermined limit said preferably bifurcated member will slip in relation to said drive shaft thus continuing the motion of the drive shaft allowing for the taking up of a flexible member on the winch until the latch is latched, but limiting the motion of the preferably bifurcated member, the preferably bifurcated member being limited in the first direction by the first stop engaging the at least a third stop and being limited in the second direction by the second stop engaging the at least a third stop, wherein the preferably bifurcated member will rotate in both directions during the operation of the winch.

According to yet another aspect of the invention there is provided a winch assembly comprising a single mounting bracket for mounting the winch assembly directly to a frame (for example beams) of a vehicle, the winch by the operation of handle means lets out and takes up a length of a member (preferably a cable) affixed at one end to the winch, which letting out and taking up of the member moves the spare tire, installed on a carrier, from a locked stored position, under a vehicle, to an unlocked accessible position below the stored position, the mounting bracket having a winch mounting area provided therewith, a tire carrier and cooperative flexible member outlet area spaced from the winch mounting area, and having affixed thereto a latch tube extending away from the bottom of the mounting bracket and for guiding the flexible member and the tire to and from the stored position, said latch tube having affixed therewith a biased latch moveable away from and toward said latch tube for engaging below said carrier when the tire is in the stored position, the mounting bracket being adapted to bolt directly to the frame members (for example beams) of a vehicle, wherein the mounting bracket for the winch obviates the need to provide welded or fasten reinforcing plates with the vehicle proximate the locations where the winch assembly is to be mounted, wherein when the tire, having side walls, is in the stored position the tire abuts the frame of the vehicle proximate the side walls of the tire placing a compressive force on the side walls of the tire which force is generated through tensioning of said flexible member by operation of the winch through the tire carrier, wherein any external displacing force placed on the tire tending to separate the tire from the winch assembly, for example a scuffing force applied when the tire bottoms out against a roadway, will be resisted by the mounting bracket, the tire carrier, the flexible member, the latch and the latch tube resolving the forces to the frame of the vehicle and preferably deforming in part the latch tube and latch should the flexible member break.

According to yet another aspect of the invention there is provided a winch assembly, having a mouth from which a resilient member extends, and being contained within a housing and affixed by mounting means near a stored position for a load, for example a preferred spare tire, the winch assembly comprising a winch reel having cooperating reel plates joined together in use and providing the winch reel and a base, the winch reel by the operation of a handle lets out and takes up a length of a resilient member (preferably a cable) affixed at one end to the winch reel proximate the base thereof and substantially accumulating in a coil around the base of the winch reel between the reel plates, which letting out and taking up of the member moves the load, for example the preferred spare tire, installed on a hub, from a locked stored position, preferably under a vehicle, to an unlocked accessible position remote and preferably below the stored position, the resilient member being pivotably retained within openings provided in each of the cooperating reel plates adjacent the base of the winch reel by an arcuate pivotable fitting contained on the end of the flexible member and having preferably hammerhead shaped pins provided on the end of the fitting extending between the reel plates for pivoting frictional engagement within the respective openings in the reel plates, the arcuate pivotable fitting being moveable from a first position wherein the arcuate pivotable fitting is adjacent the base of the winch reel and forms a part thereof thereby allowing the flexible member to accumulate or payout in a coil around the base of the winch reel including the arcuate pivotable fitting until such time as the final coil of the resilient member is payed out whereat the arcuate pivotable fitting will upon continued rotation of the reel in the direction tending to pay out the resilient member pivot to a second position proximate the mouth of the winch assembly and in combination with the resilient member provide an anti-rotate position whereat further rotation of the reel in the direction tending to pay out the resilient member is prevented, wherein further rotation of the reel in the direction tending to accumulate the resilient ember upon the base of the reel will move the arcuate pivotable fitting back to the first position and thereby allow the flexible member to accumulate in a coil around the base of the winch reel including the arcuate pivotable fitting.

In a preferred embodiment the arcuate pivotable fitting is swagged onto the end of the resilient member flattening both the end of the fitting adjacent the member and the portion of the member adjacent the fitting, wherein the at the second position the flattened portion of the member engages a detent disposed proximate the mouth of the winch assembly thereby providing the anti-rotate position.

According to a preferred embodiment of the invention there is provided with any of the aforementioned winch assemblies a drive shaft, which extends through the winch reel to the actuator, and is fastened proximate the actuator by a fastener entering an untapped opening disposed at the end of the drive shaft proximate the actuator, the fastener having a working end which when driven into the untapped opening tends to provide a rolling action for threading the opening and simultaneously being fastened within the opening.

BRIEF DESCRIPTION OF THE DRAWINGS

The invention will now be illustrated with respect to the following drawings illustrating embodiments of the invention in which:

FIGS. 7 and 8 are schematic illustrations of improvements of the invention installed and illustrated in two preferred embodiments of the invention.

FIG. 9 is a close-up side plan view of the embodiment illustrated in FIG. 7 and illustrated in a preferred embodiment of the invention.

FIG. 10 is a perspective view of the embodiment illustrated in FIG. 9.

FIG. 11 is an exploded perspective view of the embodiment illustrated in FIGS. 9, and 10.

FIGS. 12 and 13 are schematic views of the latching of the carrier illustrated in a preferred embodiment of the invention.

FIG. 14 is an exploded perspective view of an improvement to the torque limiter of the assembly illustrated in a preferred embodiment of the invention.

FIG. 15 is a cut-away view of the integrated assembly of the invention of FIG. 14 illustrated in a preferred embodiment of the invention.

FIG. 21 is a perspective view of a winch assembly illustrated in a preferred embodiment of the invention.

FIG. 22A is a schematic view of a spare tire retained on a tire carrier and illustrated in a preferred embodiment of the invention.

FIG. 23 is a bottom perspective view of the winch assembly of FIG. 21 illustrated in a preferred embodiment of the invention.

FIG. 24 is a close-up perspective view of the components making up the rotary actuator 450 of FIG. 23 and illustrated in a preferred embodiment of the invention.

FIGS. 25, 26, 27, 27A, and 28 are side views of the winch assembly of FIG. 21 and 23 illustrating the paying out and taking up of a tire carrier and illustrated in a preferred embodiment of the invention.

DETAILED DESCRIPTION OF PREFERRED EMBODIMENTS OF THE INVENTION

Figure 1:
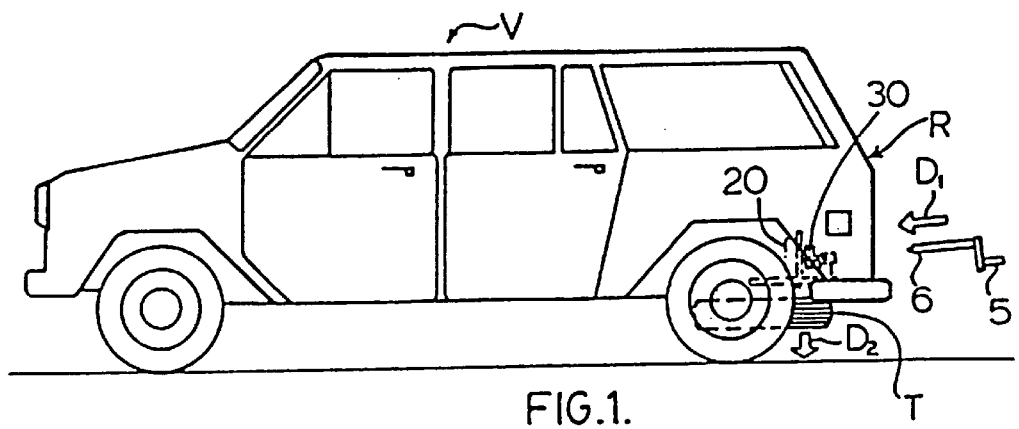
FIG. 1 is a side plan view of a vehicle upon which the invention is installed.

Referring now to FIG. 1 there is illustrated a vehicle V having a winch assembly 20 mounted therewith. Separate from the winch assembly is a torque limiter 30 which may also be integral with the winch. The tire T is conveniently stored under the vehicle V until such time as a user accesses the tire by lowering the tire using the crank handle 5 at the end 6 and inserting it to access the torque limiting device 30 attached to the winch 20. The tire T may then be moved in a direction D2 to lower the tire to the ground. Crank handle 5 is inserted in a direction D1 in the sleeve 40A wherein a latching mechanism generally referred to as 39 is disposed. The end of the handle 6 engages the cam surface 42a of the lever 40 which is connected to the rod 43 at the end 41. The rod 43 is connected to a latch 45 at the end 44 thereof. Therefore the latch 45 rotates in response to the movement of the lever 40 to disengage the shoulder 51 of the head of the shank portion 50 so that the tire carrier portion and the tire may be lowered to the ground.

The assembly includes a mounted plate 29 to which a hollow cylinder 40a is attached, by attaching portions 40b to the bracket 29. When the end 6 of the crank handle 5 therefore is inserted in the cylinder 40a end 6 abuts the lever cam portion 42a which lever 40 is pivoted at pivot 42, the use of which will be described hereinafter. Therefore the end 6 of the crank handle 5 is inserted through to the hollow shaft portion 35 which receives the end 6 of the crank handle 5. The torque limiter 30 therefore includes two outer housing portions 35a and 36a. The half 35a includes the hollow shaft portion 35 which half 35a connects to the half 36a which connects to the shaft 36 which continues on to the winch portion 20.

Figure 5:
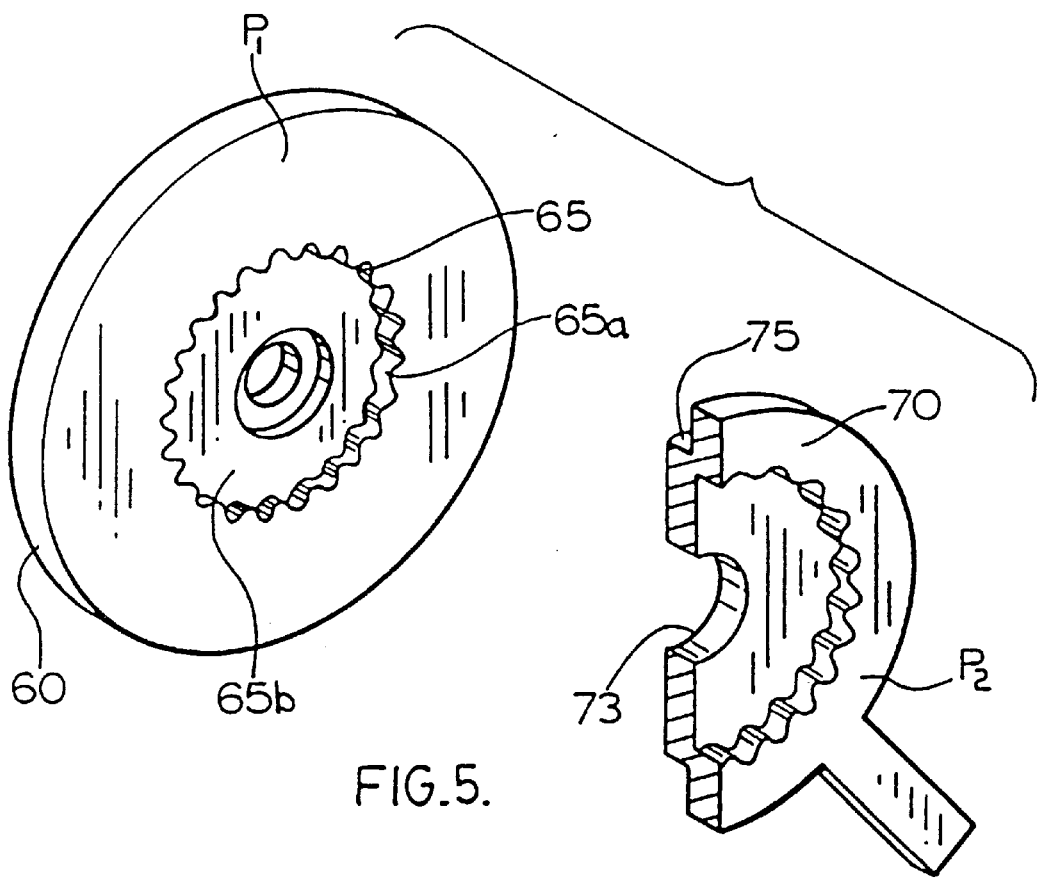
FIGS. 5 and 6 are perspective and side views respectively of the reduction gears of the winch illustrated in a preferred embodiment of the invention.
Figure 6:
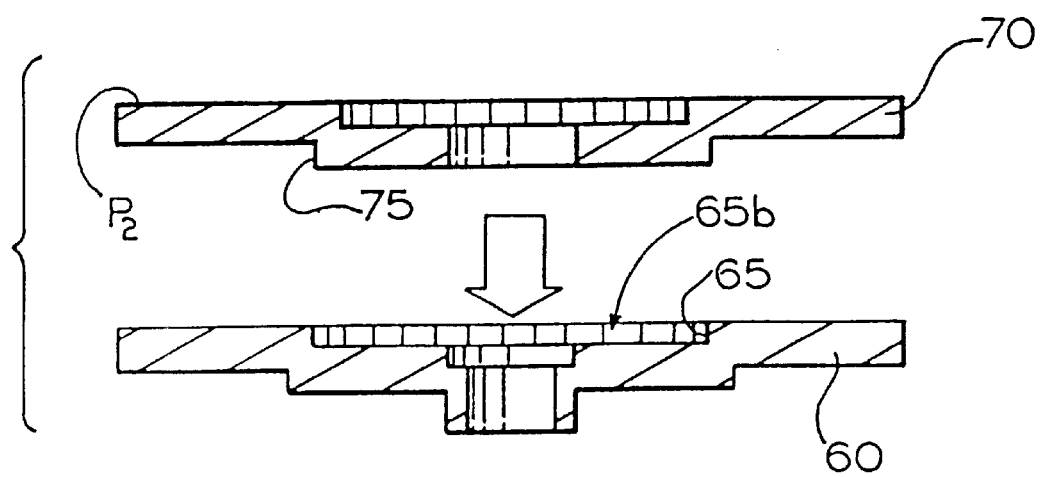

The shaft 36 then continues on to a typical winch including a reel 25. The winch 20 includes a housing 21 mounted to the mounting bracket 15 which winch 20 includes gear reduction portion 70 and 60 as best seen in FIGS. 5 and 6 which are used for speed reduction purposes. The use of these gears will be described hereinafter. A resilient cable 28 is wound on to and off of the reel 25 by the rotation of the crank handle 5 in the required direction. Any winch structure would suffice and the details of the winch are not provided for this reason. The important portions of the invention are the lever portion 40 and the related latch 45 which are actuated by the insertion of the end 6 of the crank handle 5 through the cylinder 40a.

Disposed below the mounting plate 29 is a frame portion 17. The shank portion 50a and the head 50 having shoulders 51 adjacent the shank portion 50a are contained within this frame portion 17 when the tire is retained in its stored position. The latch 45 therefore engages the shoulder portions 51 of the tire carrier 50 which retains the tire in the stored position should the cable 28 break. Further the latch assists carrying the load of the tire in the normal stored position.

The tire T is attached to a rim T1 at flanges T2 as is typically known in the art. The tire is retained in the stored position by the latch 45 being secured to the shoulder 51 of the head affixed to the shank 50a and having a flange 53 extending underneath the rim T1. This flange 53 raises and lowers the tire T from the stored position to the accessible position as the cable 28 is wound out or wound in. A spring biased device 54 which abuts the flange 54a is provided to retain the correct tension in the unit. This is well known in the art.

Figure 3:
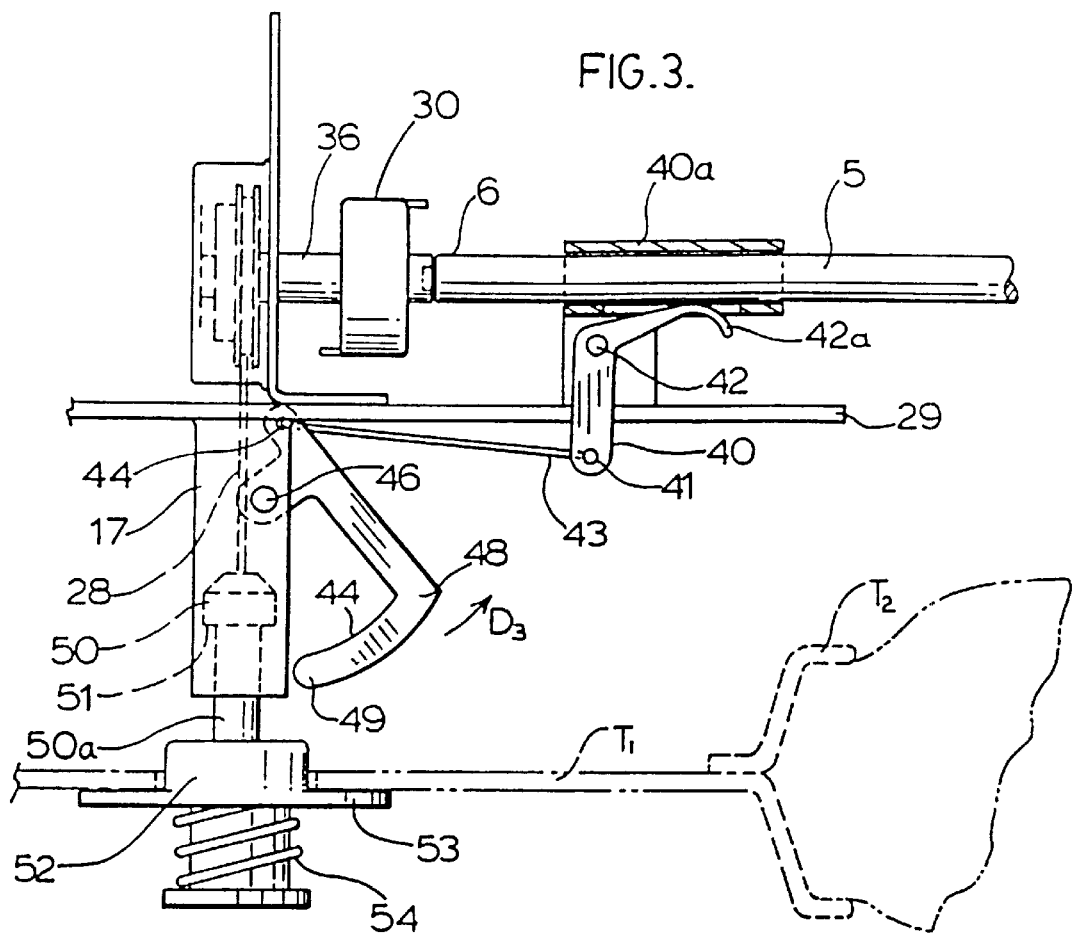
FIG. 3 is a view similar to that of FIG. 2 illustrating the action for unlatching the securing mechanism of the winch assembly when a crank is inserted for operation of the winch illustrated in a preferred embodiment of the invention.
Figure 4:
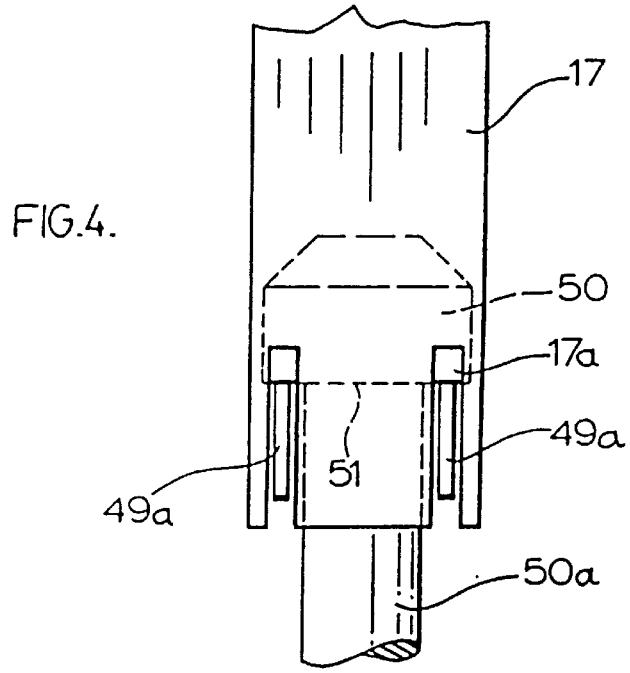
FIG. 4 is a close up view of the latching portion 49 illustrated in perspective and top plan view winch 20 illustrated in a preferred embodiment of the invention.

When the crank handle 5 is inserted toward the winch 20 the end 6 of the crank arm passes through the sleeve 40a and abuts the lever 40 at the cam surface 42a thereof to cause such lever 40 to rotate at its pivot 42 and causes the rod 43 attached to the crank or lever 40 at the end 41 to move in a direction compatible to D1 and link with the latch 45 at point 44. Therefore as the rod 43 moves in the direction D1 it causes the latch 45 pivoted at 46 via cam portion 47 to pivot in a direction D3 as best seen in FIG. 3. Therefore the locking fingers 49 are removed from recess 17A of the frame portion 17 disengaging the finger portions 49 from underneath the shoulder 51 of the head portion 50 of the tire carrier 52.

The rotation of the latch in direction D3 allows the release or latching of the shoulder portion 51 of the tire carrier 52. The tire is shown in the accessible position about to be cranked up to its stored position and latched when crank handle 5 is removed from the cylindrical portion 40a to release the detent portion 42a and thereby allow the latch portion to return to its locked position under the shoulder 51 of the carrier 52 wherein the fingers 49 lock under the shoulder 51 on the abutting arcuate surface 44 thereof wherein the tire is therefore in the latched position.

Figure 2:
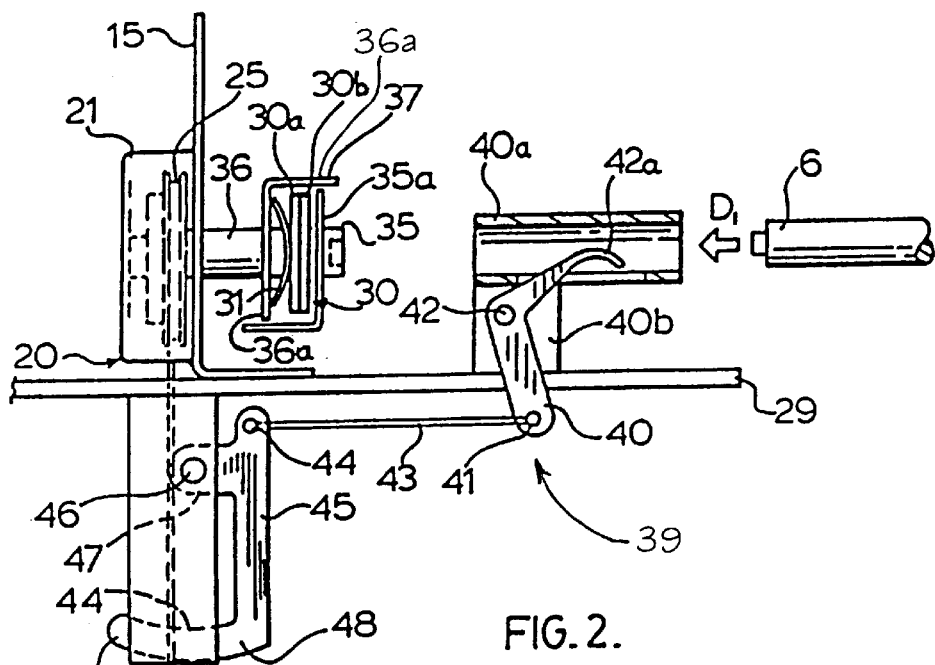
FIG. 2 is a side plan view of the winch assembly of FIG. 1 illustrating the latching mechanism thereof for securing a tire in a stored position under a vehicle and illustrated in a preferred embodiment of the invention.

Referring now to FIGS. 2 and 3 it can be readily seen that the torque limiting device 30 is contained separately from the winch assembly 20. Therefore the torque limiting device 30 includes two halves 36a and 35a which contain the torque limiting plates 30a and 30b which engage at all times and are held in constant engagement by the belleville spring 31. Therefore the spring 31 and the plates 30a and 30b are contained between the two portions 36a and 35a. The shaft 35 is affixed for example by welding to portion 35a. The portion 35a and the torque plates 30a and 30b are also pressed against the other halve of the housing 36a. The portions 37 are used for connecting the two plates 35a and 36a loosely together. Therefore when the crank handle 5 at end 6 is inserted within the hollow of the shaft 35 and turned the housing portion 36a and the shaft 36 which engages the winch 20 are also rotated. The torque limiting plates 30a and 30b include a multiplicity of teeth, which at a predetermined torque, the plates slip with respect to one another and thus provide overload protection for the winch 20. The torque limiting device 30 is a supplement to any winch and it may provide an add on package for a winch which has no torque overload protection by merely inserting this package 30 on a convenient shaft in between the housing 20 and the handle.

Referring now to FIGS. 5 and 6 there are illustrated ring gear portions 60 stamped from a metal disk wherein the recess 65 including the teeth 65a are produced by stamping the ring gear 60 so as to raise a portion thereof out of the plane PI of the ring gear 60. Similarly the planetary gear portion 70 includes teeth 75 which are formed by raising the teeth 75 out of the plane P2 of the planetary gear 70. In doing so a pocket is provided behind the section having the teeth 75 thereon. This therefore provides a simple method of forming a ring gear and a planetary gear which is easy to manufacture. The ring and planetary gear inter fit as best shown in FIG. 6 wherein the teeth 75 which extends laterally away from the plane P2 of the ring gear 70 are inserted within the opening 65b of the ring gear 60 so that the teeth 65 of the ring gear engage the teeth 75 of the planetary gear. Within the winch 20 there is an offset which is inserted within the opening 63 of the ring gear 60 so that the planetary gear may wobble about the opening 73 therein and thus provide gear reduction which is known as taumel gear reduction. Therefore within the winch 20 there is provided taumel gear reduction portions including a ring gear 60 and a planetary gear 70 which are manufactured by a stamping process from flat circular plates and have teeth on the ring gear and teeth on the planetary gear which inter engage having been formed by metal stamping techniques. Generally there is one less tooth formed with the planetary gear than the ring gear to effect the taumel principle.

Referring to FIGS. 7 and 8 there is illustrated two embodiments of improvements to the invention. The embodiments illustrate winches 120 and 220, installed adjacent the bottom V1 and V2 of vehicles VA and VB, for moving a tire TA and TB from a stored position to an accessible position. Specifically FIG. 8 illustrates a winch 220 installed at a distance from the tire TB separated therefrom by a cable access tube 228A. Further the winch 220 is disposed horizontally whereas winch 120 is disposed vertically. Handle 206 is provided in FIG. 8 to rotate the winch 220.

Referring now to FIGS. 9, 10 and 11 there is illustrated the winch 120 of FIG. 7, the winch components being contained between the housing 121 and the backing plate 115 similar to the unit described in relation to FIGS. 2 and 3. Nut 135a is provided for access by the handle H at end 106 thereof. The winch 120 is attached to the bottom VI of vehicle VA at 129 by exemplary mounting flange 115b so that the portions illustrated extend through the bottom 129 toward the tire TA. Alternatively the flange 115a may be welded to the bottom 129 of the vehicle. In this manner the cable 128 may be lowered and raised securely to and from the stored and accessible positions. The tire carrier 150 is provided at one end of the cable and operates in a similar manner to the assembly of FIGS. 2 and 3 with the exceptions as will be described as follows.

Figure 18:
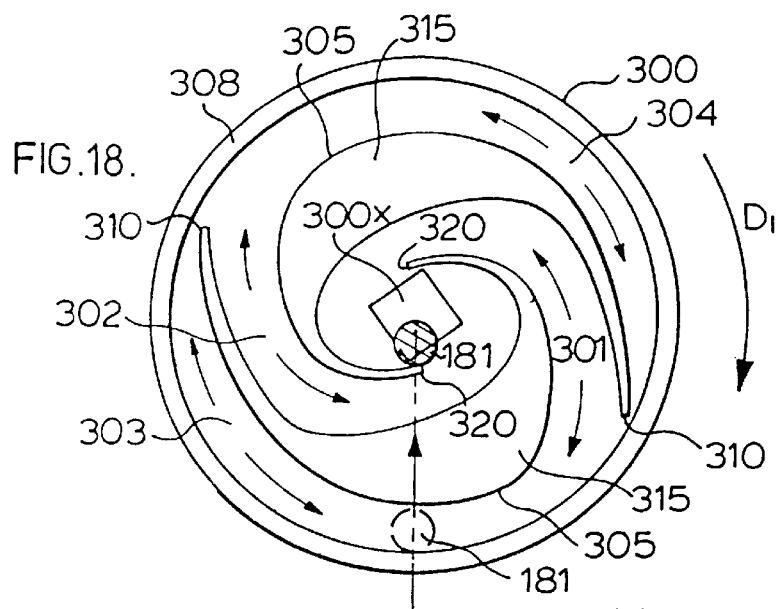
FIGS. 18 through 20 illustrate schematically the actuator 300 of the previous illustrations and the operation thereof illustrated in a preferred embodiment of the invention.
Figure 19:
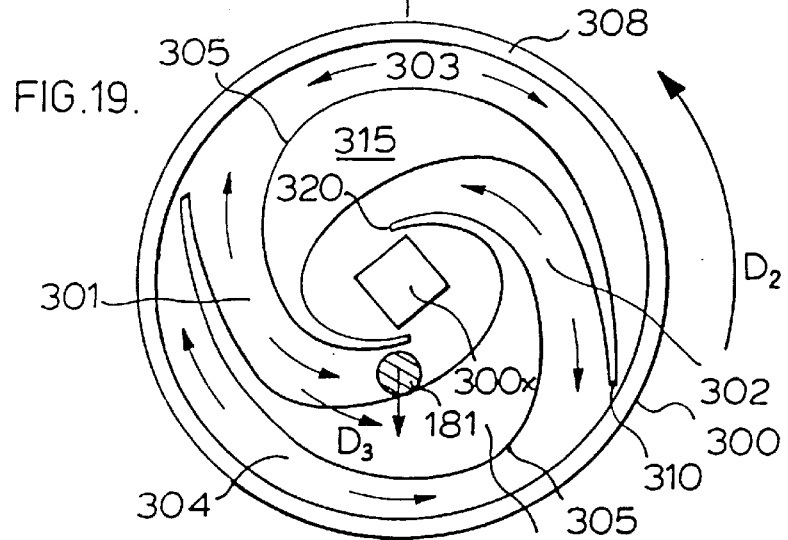
Figure 20:
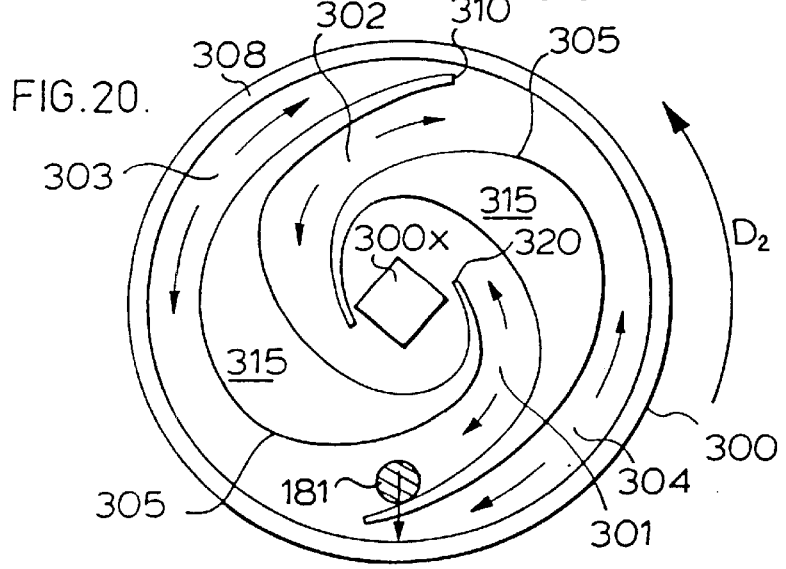

The backing plate 115 is formed from a single stamping which includes mounting flange portions 115b and 115a and flanges 115c and 115d. The portion 115c has a passage similar to that illustrated in FIG. 2 to provide for the passage of cable 128. The winch 120 and the components thereof are housed within the cover 121 and the backing plate 115. On the other side of the backing plate is provided the actuator 300 fixed in position by hexagonal threaded fastener 300a. As best seen in FIGS. 18 through 20 there is provided on the side of the actuator nearest bracket 115 substantially spiral shaped control paths 301 and 302 within which end 181 of serpentine rod 180 is disposed. When the winch 120 is operated by the handle H, the actuator 300 is also rotated. The handle H2 is operated and is connected by arm H1 to end H3 wherein is disposed at opening 106a to engage end 135a of spindle 135. When the winch 120 is operated in a clockwise direction thereby paying out the cable 128, the actuator 300 will rotate in a counter clockwise direction (when viewed in relation to FIG. 10) moving the rod end 181 towards the perimeter of the actuator which causes the lever arm 141a of lever 140 near the other end 182 of rod 180 to move about pivot 140a fixed to flange 115d of bracket 115. The leg 141 of lever 140 is fixed at 143b to rod 143 which in turn engages with openings 148a to locking member 148 which works substantially the same as item 48 of FIG. 2 with the exception that item 148 moves in a more linear fashion than item 48 of FIG. 2. A torsion spring 148b is provided to bias member 148 within windows 115f of flange 115c to the locked position. Therefore when the carrier is in the position shown in FIG. 13 as the winch 120 is rotated the actuator is also rotated to move end 181 of rod 180 in the manner described above so as to remove the forks 149 sufficiently away from the carrier shoulder 151 to allow the cable 128 to be payed out and the tire to be moved to the accessible position. When the winch 120 is rotated back to the stored position, after a tire change and presumably with a repaired tire thereon, the rod end 181 will be moved along paths 301 and 302 towards the centre nut 300a returning the forked portions 149 to the latched position. As the carrier 155 returns to the latched position the head 150 abuts the tapered surface 149a of forks 149 at cam surface 150a thereby forcing the forks 149 away from the head 150 as best seen in FIG. 12 until the forks are free to return under the shoulders 151 of head 150 as best seen in FIG. 13, being biased to do so by torsion spring 148b.

Figure 16:
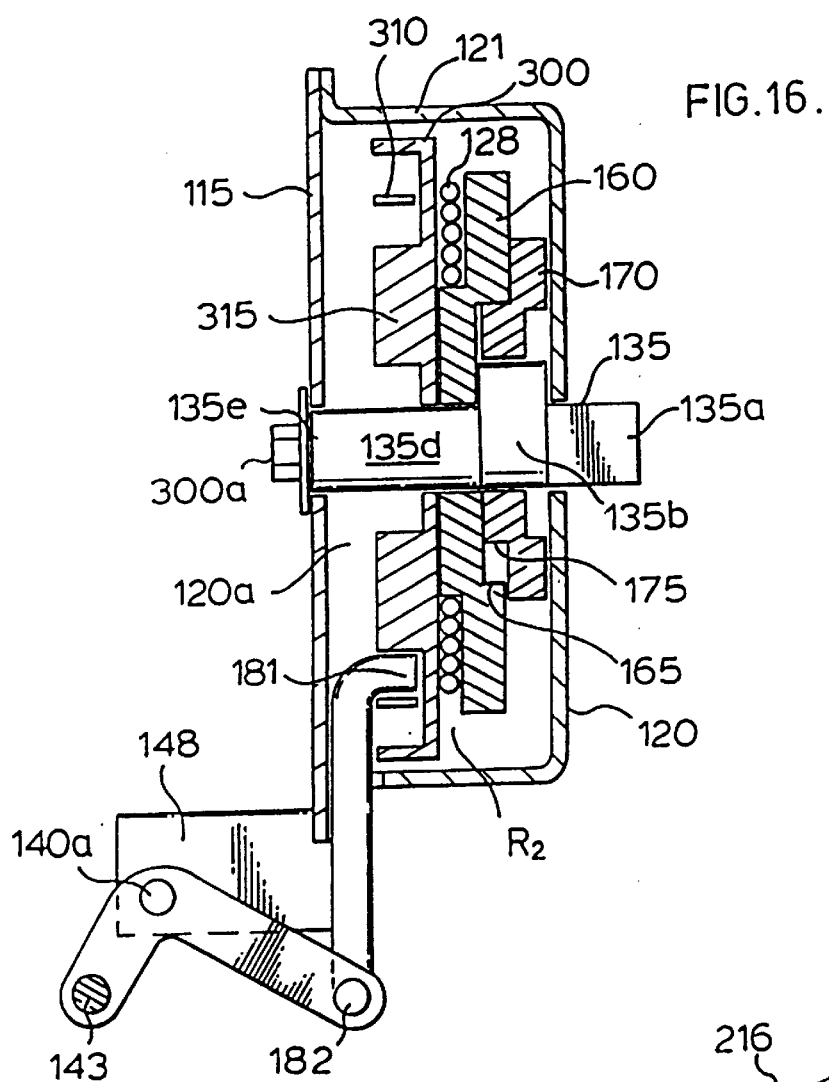
FIG. 16 is a partially cut-away side plan view of a winch including a unique actuator contained within the housing of the winch and illustrated in a preferred embodiment of the invention.

As best seen in FIGS. 14, 15 and 16 cable 128 is anchored in slot 160a of circular plate 160 which plate forms one half of the winch reel R defined with the other reel plate 161. As shown the cable will therefore wind on the reel R in a clockwise direction (when observed from the housing end 121 of FIG. 14) in this embodiment only, and accumulates one layer above another on surface 160b when the winch is operated. A housing 121 is provided at one end of the winch components which is mounted via opening 121e (via fasteners not shown) to the bracket 115 also providing the other closing end of the winch 120. A spindle 135 therefore extends through the opening 121b of housing 121 and an opening 117 in the mounting plate 115 as best seen in FIG. 15. A nut end 135a is therefore provided for access by the handle H or for engagement with a separate clip on torque limiter as best seen in FIGS. 14 and 15.

Figure 16A:
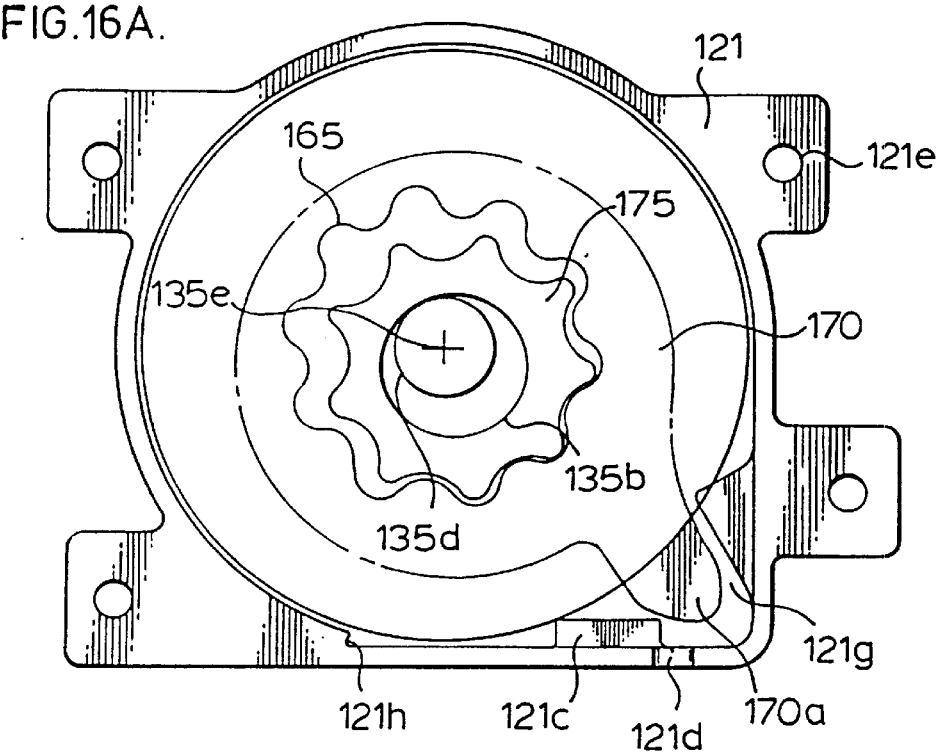
FIGS. 16A and 16B illustrate the operation of the winch of FIG. 16.

The spindle 135 therefore passes through an opening 173 of gear plate 170 which has gears 175 provided therewith, having nine teeth. A tail portion 170a is provided with gear plate 170 to prevent the free rotation thereof in operation as best seen in FIG. 16A. The spindle 135 therefore engages gear plate 170 proximate opening 173 at eccentric portion 135b of spindle 135, the opening 173 being slightly larger than the eccentric portion 135b. The eccentric portion therefore wobbles within the opening 173 or gear plate 170 in use.

As best seen in FIG. 15 the spindle portion 135d therefore passes thereafter through, the opening 160d of reel plate 160, the opening 161b of reel plate 161, the opening 117 of bracket 115, and finally through the opening 300x of the disk shaped actuator 300 whereat a hexagonal threaded fastener 300a engages opening 135e, as best seen in FIG. 15, thereby fastening and retaining all of the winch components.

The reel plate 160 is constructed similarly to the structure illustrated in FIG. 5 and has a ring gear 165 formed on the side thereof nearest the gear plate 170, as best seen in relation to FIG. 16A, which has ten engaging teeth to engage the nine teeth 175 of gear plate 170. This difference of one tooth in the number of teeth between the gears 165 and 175 causes a speed reduction but increased torque in the operation of the winch which speed reduction principle is known and described in many winch assemblies in the prior art. Therefore as the handle H is operated in a clockwise direction (when observed in FIG. 14), the spindle 135 will also rotate in a clockwise direction; the eccentric portion 135b operating within the opening 173 of gear plate 170 with the nine teeth 175 engaging the ring gear teeth 165, numbered ten, of reel plate 160 thereby driving the reel R in a direction so as to take-up cable.

Figure 16B:
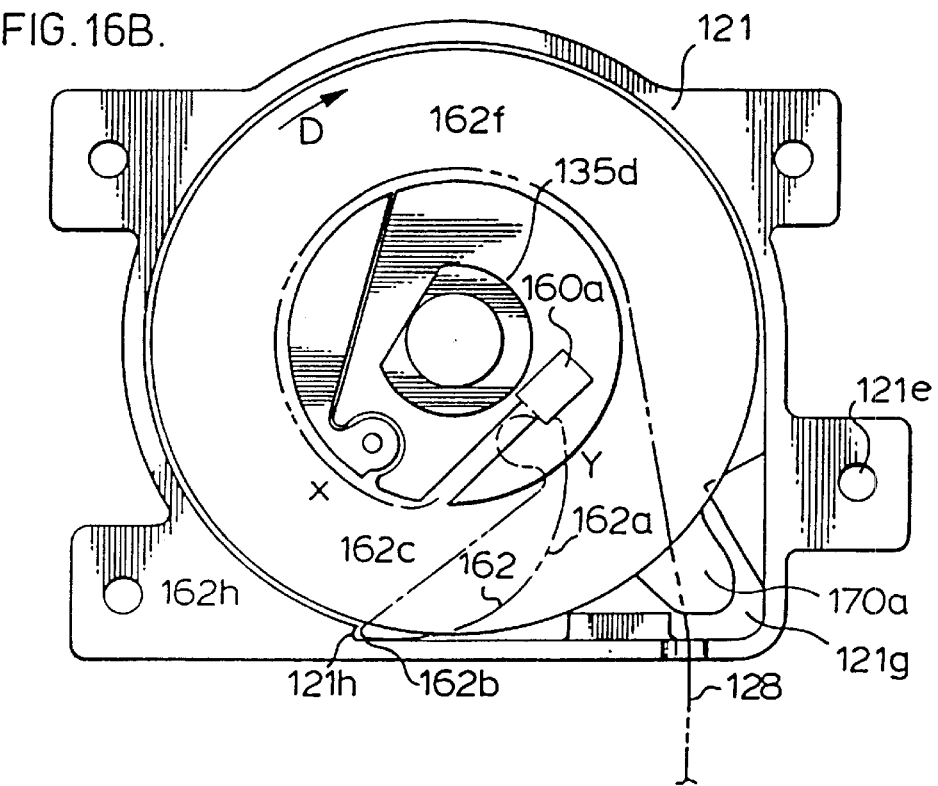

The cable 128 is anchored in opening 160a of reel plate 160 via fastener 128a in a conventional manner. Therefore as the winch is operated the cable will be taken up in the clockwise direction and payed out in the counterclockwise direction. Of course this may be reversed in design. As best seen in relation to FIGS. 11 and 16B there is provided as a part of the bottom 160b of reel R, a resiliently biased arm 162 provided as an anti-back driving feature for the winch 120. The arm 162 includes an arcuate side 162a which abuts in use the first coil of cable 128 and is retained in position by the first coil at position X, until the cable is payed out to the position Y in FIG. 16B, whereat the arm 162 being resiliently biased outward by torsion spring 162d upon further rotation of the winch engages the detent 121h of the housing 121 at 162b thereby preventing the further rotation of the reel R and the risk of the winch back driving and taking up cable with the further rotation of the winch 120 thereby damaging the cable. The arm 162 includes a torsion spring 162d having two ends. The first end 162f extends along the arm in a long groove cut in the arm to ensure the proper biasing and motion of the arm, and the second end 162e extend towards the reel plate 160 and is anchored in an opening in reel plate 160 (not shown). A pin extends through opening 162h to anchor the arm 162 to reel plate 161 at opening 161d. Generally an arm such as arm 162 is taught in the art in U.S. Pat. No. 2,053,976 issued September of 1936.

Referring now to FIGS. 14 and 15 there is illustrated the same winch structure of FIGS. 9 through 13 with the addition that a torque limiting unit 130 is provided which fastens to the side of housing 121 by annular ring 121a which includes portions 121x which act as clips to fasten over flange 137a of torque limiter housing 137. The housing and the contents thereof when aligned so as to engage the end 135a of spindle 135 as shown therefore clips in position when the flange 137a is pressed over clips 121x causing the clips to flex downwardly until they pass the flange and clip thereof to retain the housing 137 in position. The clips are formed with the annular ring 121a of housing 121 with separations defined between the portions 121x and the ring 121a to allow the independent flexing of the clips.

The torque limiter 130 is similar in design to that illustrated in FIGS. 1 through 6 with the exception that it is joined to the winch housing as a supplementary member utilizing one side of the winch housing 121 to act as a backing plate for housing 137 to retain the torque limiter components. A spring therefore is provided to ensure the engagement of the teeth 132, 133 disposed upon adjacent surfaces of gears 130*a* and 130*b* as best seen in FIG. 15. Member 130*a* also includes a nut portion 130*e* for engagement with the handle H in use. Member 130*b* includes a spindle engaging portion 133*a* to engage portion 135*a* of the spindle 135 and hence drive the winch 120 in the manner described previously. Therefore if the handle H accesses the nut 130*e* formed with the gear 130 via portion H3 thereof, H3 engages the seal H5 of the assembly (which is recommended as a barrier to dirt and moisture but is optional) and nut portion 130*e* of the torque limiter extending through opening 137*b* of the housing 137. As the handle H is rotated the nut 130*e* will cause the gear 130*a* to rotate which because of the engagement of teeth 132 and 133 will cause the gear 130*b* to rotate which will in turn cause spindle end 135*a* to rotate as engaged by portion 133*a* of gear 130*b*.

The teeth 132 and 133 remain in engagement as biased by belleville spring 131 which under normal operating conditions ensure the engagement of teeth 132 and 133. The torque limiting plates 130*a* and 130*b* include the multiplicity of teeth 132 and 133, and at a predetermined torque, the plates slip with respect to one another and thus provide overload protection for the winch 120. The torque limiting device 130 is a supplement to any winch and it may provide an add on package for a winch which has no torque overload protection by merely inserting this package 130 on the winch housing thereof as illustrated in FIG. 15 and described above. The balance of the winch assembly 120 and the operation thereof remains as described above.

Referring now to FIG. 16 there is illustrated a winch assembly as previously described with the exception that the actuator 300 replaces the reel plate 161 in defining reel R2 with reel plate 160. Otherwise the operation thereof is identical to previous descriptions of the assembly. However the embodiment of FIG. 16 presents a more compact package. Further the torque limiting features illustrated and described in relation to FIG. 15 may be incorporated therewith.

Figure 17:
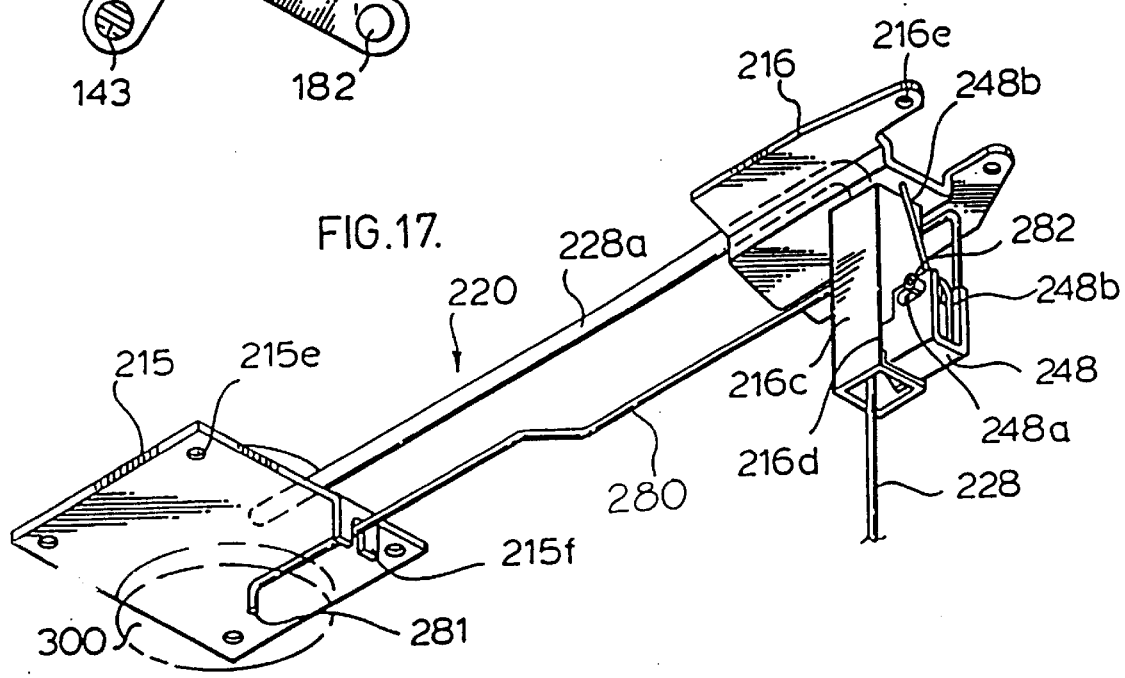
FIG. 17 is a schematic perspective view of the assembly of FIG. 8 illustrated in a preferred embodiment of the invention.

Referring now to FIG. 17 there is illustrated the winch assembly 220 as illustrated in relation to FIG. 8 which separates the components previously described in order to provide a package which may be oriented horizontally. Therefore a mounting plate 215 and a latch bracket 216 are provided. The winch 220 being fastened in use to plate 215 at the bottom of the vehicle and including all of the features previously described including the actuator 300 for engagement with rod end 281 of rod 280. A tube 228*a* is provided to smoothly carry the cable 228 from the winch 220 to the tire carrier in a manner consistent with the previous descriptions. The rod 280 operates in a manner consistent with the operation of rod 180 described and illustrated above. The latch bracket 216 is mounted under the vehicle via opening 216*e*, and carries a latch 248 engageable in openings 216*d* disposed with downwardly extending bracket 216*c* in a manner as previously described. The rod end 282 rides in slots 248*a* in latch 248 which as previously described is resiliently biased to the latched position of the carrier by the torsion spring 248*b*. The rod 280 is guided by portion 215*f* and an equivalent portion on latch bracket 216 (not shown) to ensure rod 280 travels in a substantially linear path to provide linear motion of latch 248 when engaging and disengaging the carrier head 150. Otherwise the operation of the winch 220 and rod 280 in relation to actuator 300 are consistent with the description in relation to FIGS. 9 through 15 above.

Referring now to FIG. 16A there is illustrated the wobbling effect of plate 170 and the gears 175 thereof with respect to the ring gear 165 of reel plate 160 as driven by eccentric 135*b* of spindle 135. The plate 170 includes a tail portion 170*a* which is retained in area 121*g* of the space defined in housing 121 so as to prevent movement of the plate 170 beyond the bounds set by 121*g*. The motion of the eccentric will cause the gear 175 to drive the reel plate 160 at a speed reduction as is known and described above.

Referring now to FIGS. 18 through 20 and FIGS. 14, 15 and 16 there is illustrated the actuator 300 being molded from nylon or plastic with the opening 300*x* provided therewith for the fastening of the actuator in position as described previously. Substantially arcuate paths 301 and 302 are provided therewith to control the motion of rod end 181 (or 281) when the winch 120 (or 220) is operated. The paths 301 and 302 are defined between two substantially spiral shaped raised portions 305 which include a centre broad portion 315 and flexible flange portions 310 and 320 at the ends of the raised portions 305. Also provided to retain the rod end in use is a raised ring 308. The raised portions 305 therefore control the rod end 181 therebetween as the actuator 300 is rotated. For example when the tire is in the stored position and the latch 148 latches the carrier head 150, it may be desired to lower the tire for access. The rod end therefore begins at the position as shown in FIG. 18 proximate the centre of the actuator 300. If the actuator were rotated in a direction D1 the rod will remain in its position of FIG. 18 and the flexible flanges 320 will flex outwardly away from the rod end 181 to allow it to pass in one direction only. However when the actuator 300 is rotated in the direction D2 it will be forced to move along the substantially spiral path 301 for one quarter of a turn, not being able to pass the flexible flange ends 320 of the actuator, until the rod end reaches a position near the perimeter of actuator 300. The rod end then travels in paths 303 and 304 bounded by the raised portions 305 and the raised collar 308, passing the flexible flanges 310 in one direction only. The continued rotation of the actuator retains the rod end 181 in the control paths 303 and 304. In moving the rod end 181 from near the centre of the actuator 300 to near the perimeter of the actuator 300, the rod 180 therefore has been moved an equivalent linear amount to the radius of the actuator so as to disengage the latch 148 from the carrier head shoulder 151 as previously described and to allow the lowering of the carrier and the tire to the accessible position. Therefore continued rotation of the winch will not change the position of the rod end 181 until such time as the tire is returned to the stored position and the actuator is rotated in direction D1 whereat the rod end 181 will not be able to pass the flexible flange 310 and will be forced to return along arcuate path 301 or 302 to near the centre of the actuator 300 whereat the rod end 181 will pass the flexible flanges 320 continually until the tire is raised and latched as described previously in relation to FIGS. 12 and 13.

All of the components of the winch assemblies previously described may be manufactured from resilient materials such as nylon or other thermoplastic materials in order to reduce the weight of the assembly. However this is not essential. In doing so weight savings may be realized. Further the embodiments of the invention considerably reduce the number of components of the assembly and hence reduce the weight and increase the reliability thereof. For example a winch assembly of FIG. 8 may be reduced from previously known structures from 43 parts in total to 28 parts, a 34% savings, at a weight reduction from 4.75 pounds to 3.5 pounds, a 26% savings in weight.

Figure 31:
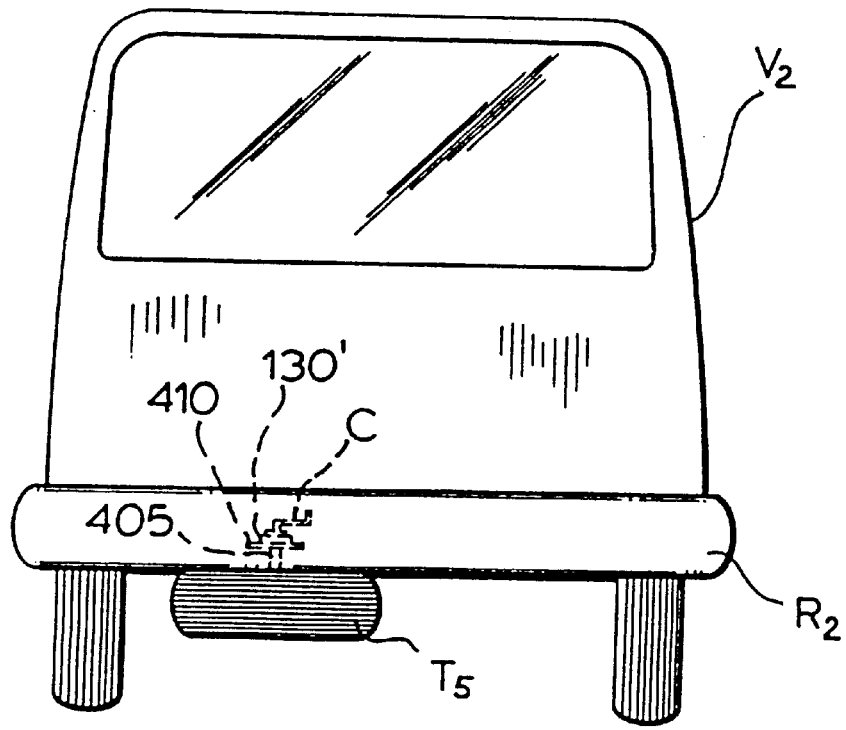
FIG. 31 is a schematic view of the installation of the winch assembly of FIG. 21 proximate the rear of a mini van and illustrated in a preferred embodiment of the invention.

Referring now to FIG. 21 and 23, there is illustrated a winch assembly 400 which is manufactured to be installed under a van as seen in FIG. 31. The winch assembly therefore includes a single mounting plate 410 which has reinforcing portions provided therewith. A land reinforcing portion 419 is provided proximate the latching tube 405 which has two substantially square tang portions 405*a* extending up through an opening 405*b*. The tang portions 405*a* are therefore welded in position with the land reinforcing portion 419. Extending toward the perimeter of the mounting bracket 410 are rib portions 418, 417 and 415 substantially as shown. The side edges of the mounting bracket 410 are reinforced at 420 and 421 to provide a rigid mounting bracket for mounting beneath the van VD of FIG. 31. A winch assembly containing the components substantially as previously described in any of the previous embodiments of winches, is therefore mounted on the bracket 410. The winch assembly 130' therefore includes a housing 131' preferably made from glass fibre reinforced nylon which includes downwardly extending flexible tang portions 131*a'* which have outwardly extending tooth like detent portions as best seen in FIG. 25 which press against the openings 410*a* and the mounting bracket 410 and therefore retain the housing 131' in position either by compression or tension. A crank portion 135' enables the access via handle portion C to the operation of the winch. The winch 130' carries a cable which is wound on a reel substantially as previously described. The cable 128 therefore extends down through a guide tube 136' through the latching tube 405 and down to the end opposite the reel of the winch 130' wherein a nut 128*a* is provided for engaging a tire carrier base 455 which engages with a separate tube portion 445 having an enlarged head at 445*a* as previously described in relation to FIG. 2 and FIGS. 3 and 4.

The embodiment of FIG. 21 through 28 includes another form of an actuator 450 which converts the rotary motion of the handle C into a linear motion to move the wire 432 from a position as shown in FIG. 23 to a position as shown in FIG. 26. The actuator 450 is mounted on the end of the drive shaft 135' best seen in FIG. 25 which is tapped at the end thereof which allows the screw 453 and the washer 452 to mount the separate plate portions 451 and 454 to the shaft 135'. The actuator 450 therefore includes a generally round plate 454 made from metal and a substantially round plate 451 made from a plastic material such as nylon, acatel or the like which includes an arm portion 451*c* included therewith a recess 451*b* for receiving the end of the wire 432. The other end of the wire 432 engages the latch assembly 430 as best seen in FIG. 26 and moves said latch assembly 430 and the forks 430*a* outwardly away from the head 445*a* of the tube 445 so that as the handle C is moved in a direction D1 as seen in FIG. 25, the latch will not encumber the movement of the cable 128 or the tire carrier 455. The latch tube 405 includes openings (not shown) through which the forks 430*a* extend. It is suggested that the ends of the forks 430*a* proximate the tips 430*b* be angled outwardly towards the sides of the torque tube to increase the locking action of the latch. The latch assembly 430 is therefore mounted to the latch tube 405 which is mounted to the mounting plate 410. The cable tube 136' extends down into the latching tube 405 and the cable thereafter extends down to the end of the tire carrier proximate the nut 128*a*. The latch 430 is operated by the wire 432 as the winch is rotated so that unknown to the operator the safety mechanism provided with latch 430 and the latch tube 405 in conjunction with the tire carrier portions 445*a* and 445 will move away from the head 445*a* of the carrier therefore allowing the user to crank the spare tire down to the ground without knowing that a safety mechanism exists as previously described. The safety mechanism will ensure that should the cable break that the tire will not fall, wherein the head 445*a* and specifically the shoulder thereof will engage the latch portion 430*a* and 430*b* and prevent losing the tire T1.

The actuator portion 450 therefore will rotate with the winch 130' until such time as the arm portion 451*c* engages the stop portion S2 substantially as shown in FIG. 26 wherein the metal plate 454 will continue to rotate along with the winch allowing the tire carrier 455 to be moved downwardly toward the ground whereas the plastic portion 451 and specifically the face thereof 451*a* will slip in relation to face 450*a* and allow the continued motion of the winch to pay out the cable 128 and the carrier 445 down to the ground in the direction shown in FIG. 26 and the clutch plates will slip in relation to one another to allow for this action to occur. The latch therefore will stay in the position substantially shown in FIG. 26 until such time as the winch is cranked in the opposite direction after the tire is removed as shown in FIG. 27 wherein as described in relation to FIG. 27*a* the actuator will adopt the position initially as shown in FIG. 27 wherein the arm portion 451*c* will engage stop S1 and the plate 454 will continue to rotate and the plate 451 will slip in relation to plate 454 and the latch 430 will be positioned substantially as shown in FIG. 27 until such time as the head portion as previously described and now illustrated in FIG. 27 with relation to this embodiment will engage the incline surface of the latch portion 430*a* proximate the portion 430*b* causing the latch 430 to move backwardly in a direction D2 as the handle C is cranked in the direction D3 and allowing the fork portions 430*b* to rest below the head 445*a* of the carrier portion 445. This action works substantially as previously described. The major differences with this assembly is the single mounting bracket and the clutch plate actuator which converts the rotary motion of the winch to the linear motion to disengage the latch.

Figure 28:
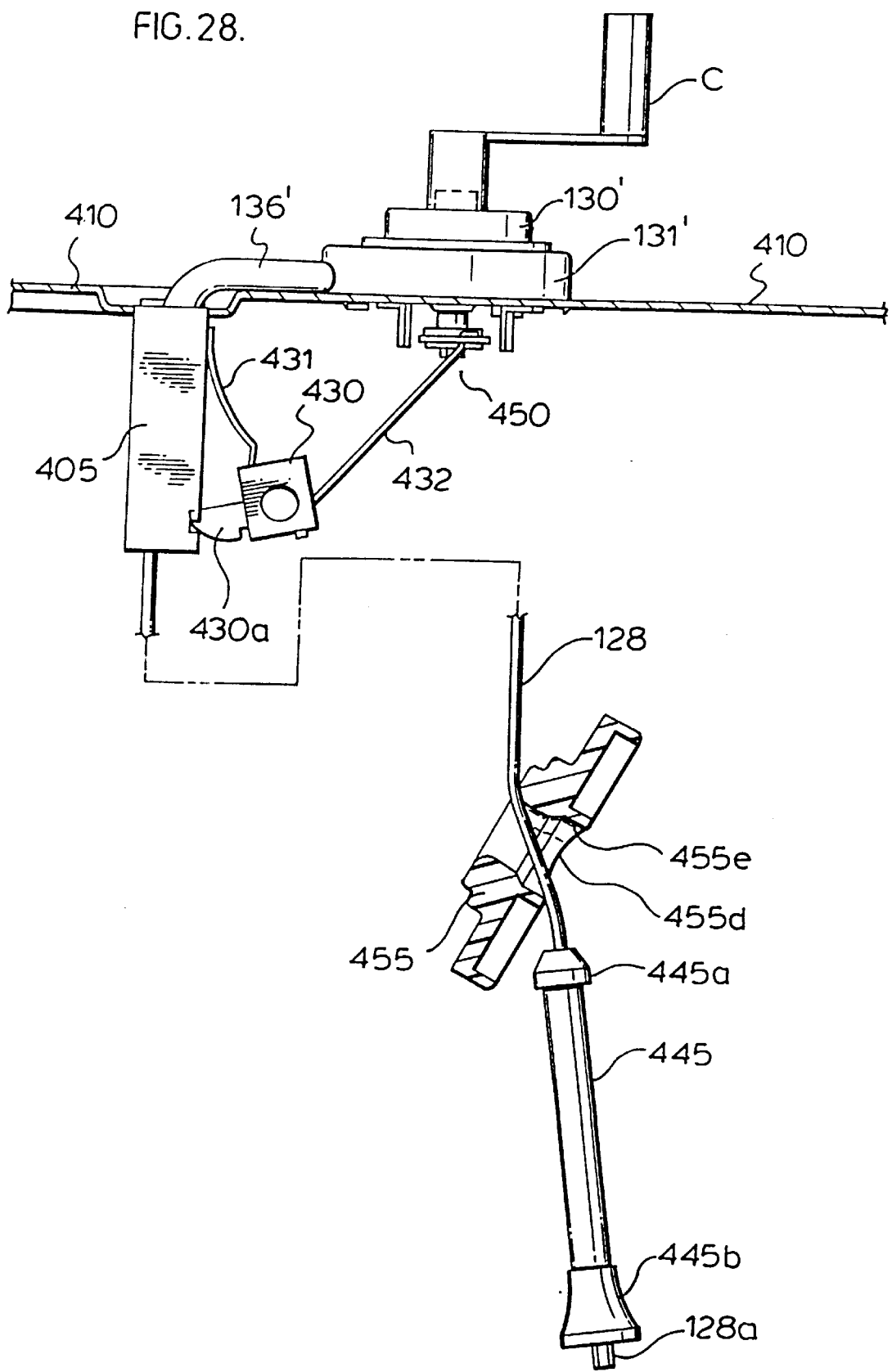

Referring now to FIG. 23, FIG. 27 and FIG. 28, there is also illustrated a unique tire carrier which is made up of two parts. The first part is a tube portion 445 having two ends and having located near the first end an extended head 445*a* and near the other end a tapered portion 445*b*. The tube includes an opening extending through the center thereof to receive the cable 128 which is anchored in position at the bottom of the tube as shown. The base portion 455 includes an opening 455*d* extending there through and including a tapered wall 455*e* to receive the taper of the enlarged portion 445*b* of the tube so that the first end 445*a* will readily pass through opening 455*d* but the second end 445*b* will not. This two part construction of the tire carrier is convenient as the two portions 445 and 455 separate when removing a tire from the carrier so that the tire easily comes off the carrier when moving the tire to the ground and alternatively when the carrier is assembled to carry the tire as the two portions 445 and 455 come together to form a unique carrier. The base portion 455 includes on the bottom 455*a* thereof alternating rib 455*b* and openings 455*c* to reduce the amount of plastic required used to form the base and yet still form a strong base. The two portions therefore come together to form a unique tire carrier which as best seen in relation to FIG. 21A and 21B and which also provides for the various widths of tires to be stored on the tire carrier.

Figure 29:
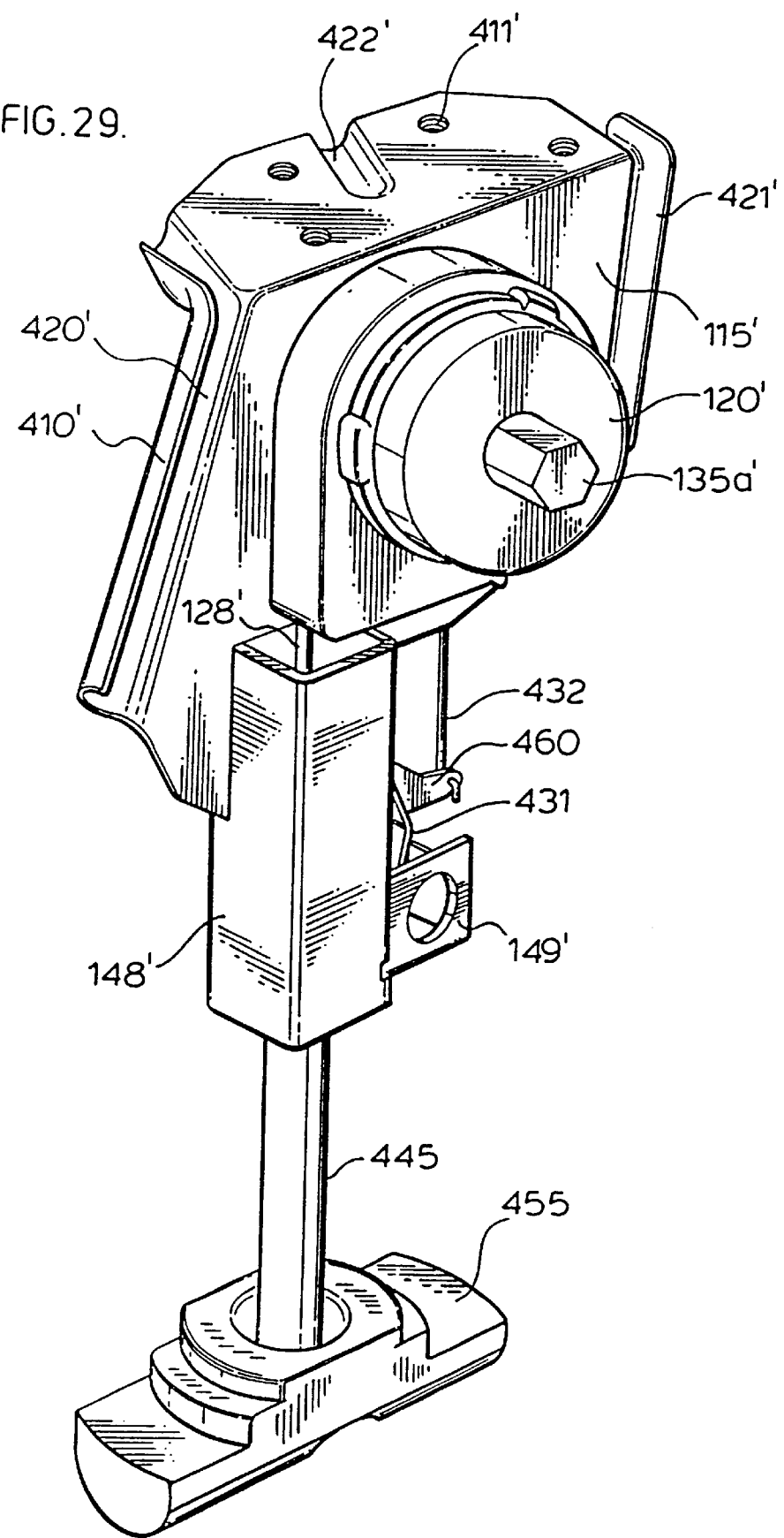
FIG. 29 is a perspective view of an alternative embodiment of the invention.

Referring now to FIG. 29 and FIG. 10 there is illustrated a similar embodiment to that of FIG. 10 with the exception that the structure of FIG. 29 includes the actuator of FIG. 21 and not the actuator 300 of FIG. 10. In mounting bracket 410' therefore is provided for a winch assembly 120' having a crank portion which is accessible at 135*a'*. The mounting bracket 410' is reinforced at the perimeter thereof via portions 420' and 421' and proximate the mounting holes 411' at reinforcing rib 422'. The latching tube 148' is provided with a latch 149' which works substantially the same as that described in relation to FIG. 10. The two part carrier assembly including portions 445 and 455 is provided with this assembly. A rod or operator 432 extends down from the actuator portion 450 substantially as previously described in relation to FIGS. 21 and 23 which engage the end of a cam shaped sector 460 which engages the spring portion 431 which activates the latch portion 149'. The embodiment of FIG. 29 is meant to be installed within a pick-up truck environment whereas the embodiment of FIG. 21 is designed to be installed in a mini van.

Figure 30:
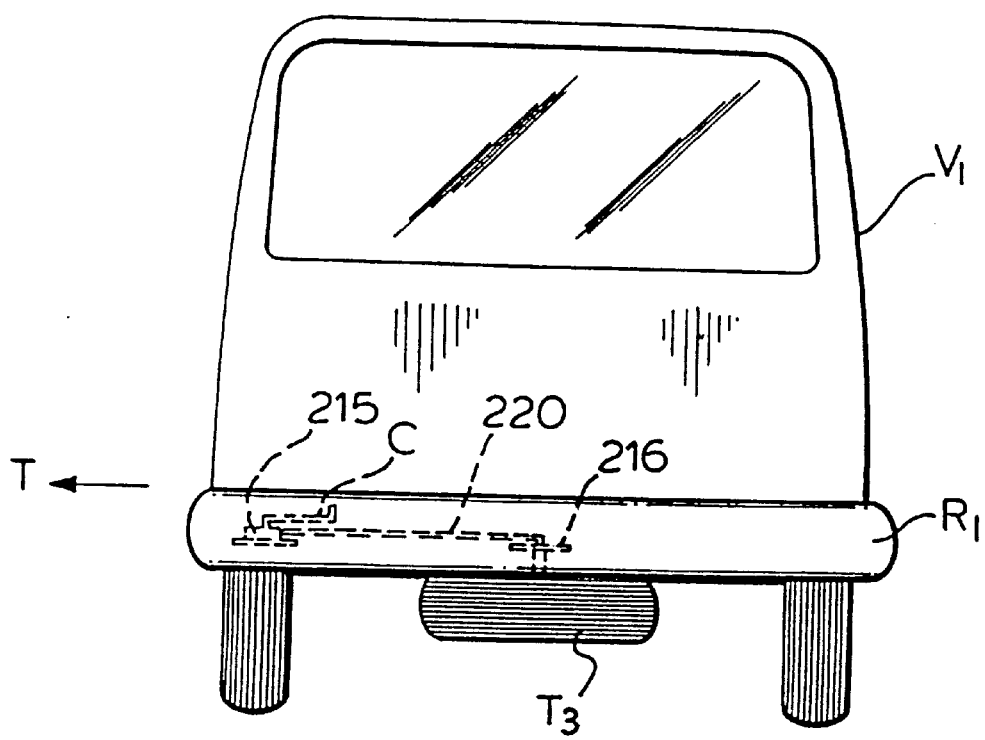
FIG. 30 is a schematic view of the installation of the winch of FIG. 17 or winch assemblies similar thereto with a mini van.
Figure 32:
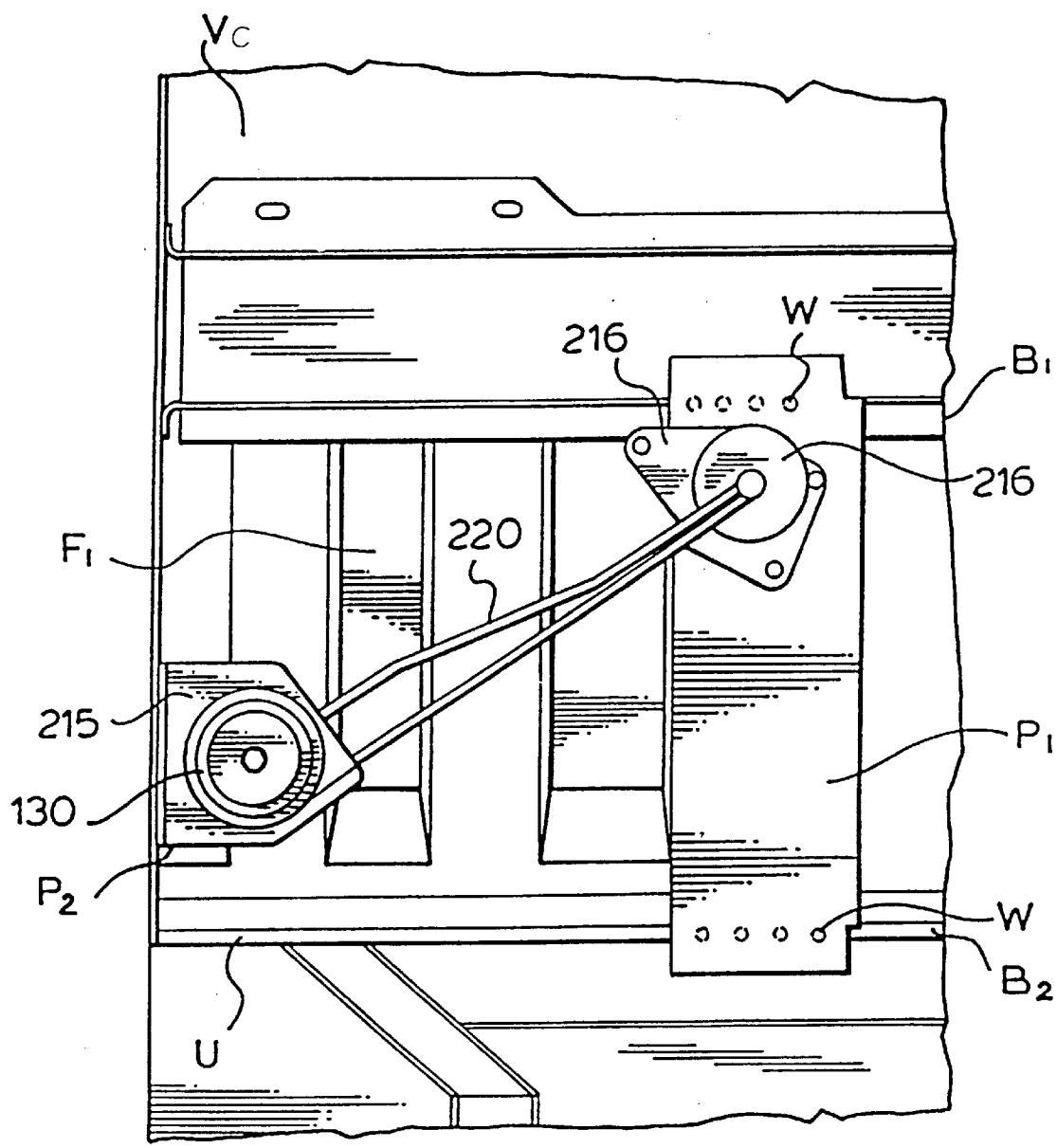
FIG. 32 is an illustration of the undercarriage of the vehicle VC of FIG. 30 illustrating the components necessary for the correct amounting thereof.

Referring now to FIG. 30 and 32, there is illustrated the installation of the winch assembly of FIG. 17 in a vehicle VC so that the mounting bracket 215 is located proximate the wheel well for the tire at the rear driver side of the vehicle. The bracket 216 is mounted substantially as shown near the center of the vehicle so that the tire T3 may be raised and lowered near the bumper R1 at the rear of the vehicle VC. As seen in FIG. 32 therefore, a reinforcing member P1 is therefore provided for mounting of the tire carrier bracket 216 substantially as shown which member P1 is tack welded to the beam portions B2 and B1. The bracket P1 therefore will accept the tire carrier bracket 216 which also includes a latching tube portion 216c substantially seen in FIG. 17. In providing this installation as shown the winch bracket 215 may also require a reinforcing bracket P2 installed adjacent the wheel well of the van at that location so that the winch 130 may be operated. When accessing the winch therefore, a user will be located near the rear left of the vehicle in the direction of traffic T as seen in FIG. 30 and there is a greater safety risk for the user at that location. The vehicle VC therefore includes a corrugated floor pan F1 which includes beam portions B1 and B2 which are generally hat shaped sections. Further, the reinforcing portion P1 is generally a hat shaped section as well and the bracket 215 may be alternatively welded to the side rail of the wheel well wherein a further reinforcing bracket may or may not be present.

Figure 33:
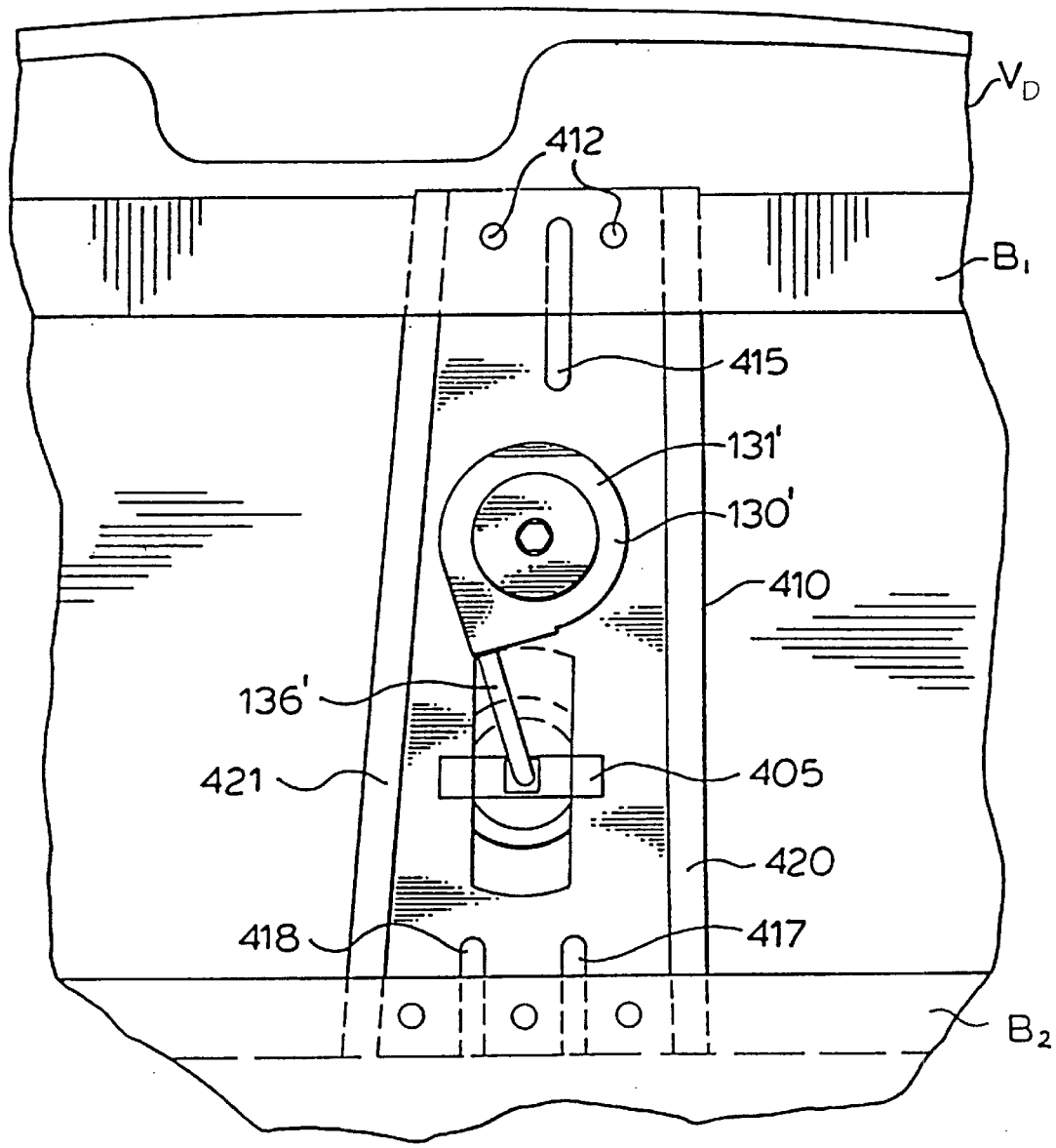
FIG. 33 is a schematic view of the installation of the winch assembly of FIGS. 21 and 31 in a vehicle VD and illustrated in a preferred embodiment of the invention.

Referring now to FIG. 31 and 33 there is illustrated the installation of the winch assembly of FIG. 21 within a vehicle VD near the rear thereof. The mounting bracket 410 therefore is mounted via mounting openings 411 and 412 to beams B1 and B2 which are substantially the same position for the vehicle VC as vehicle VD proximate the rear R2 of vehicle VD . The reinforcing portions 417, 415, 418, 419, 420 and 421 are provided with a single mounting bracket 410 for the winch 130' and the winch housing 131' mounted proximate the rear of the vehicle VD where it is mounted to the beams B1 and B2 without the need of reinforcing plates or welding thus eliminating costly, manufacturing labour and materials. Further in such an installation, the winch handle C therefore is disposed closer to the center of the vehicle VD so that the individual using the winch is not as endangered in the line of traffic as with the case of FIG. 30. The hat section bracket P1 of FIG. 32 is therefore eliminated in FIG. 33 as is the need for welding to the cross beams. The winch assembly now is substantially in line with the center line of the vehicle via a 5 bolt mounting system with the tire carrier disposed more to the front and the crank and winch assembly disposed more to the rear of the vehicle. Therefore the embodiment of FIG. 21 is much simplified, much more compact and ergonomically engineered than is the installation of FIG. 17.

The winch assembly of FIGS. 21 (and also FIG. 29) therefore includes a one piece plastic housing which readily clips into position within the openings of the mounting bracket 410 via openings 410a. A shaft extends therefore through the winch from the crank portion 135' which extends from proximate one end of the winch as best seen in FIG. 21 to the actuator 450 which releases a latch 430 for a safety latch system embodied with a latching tube 405 which extended downwardly from the same mounting bracket 410 to which the winch 130' as assembled. The winch components may be made from plastic, nylon, delrin or any other strong resilient acceptable material.

Figure 16C:
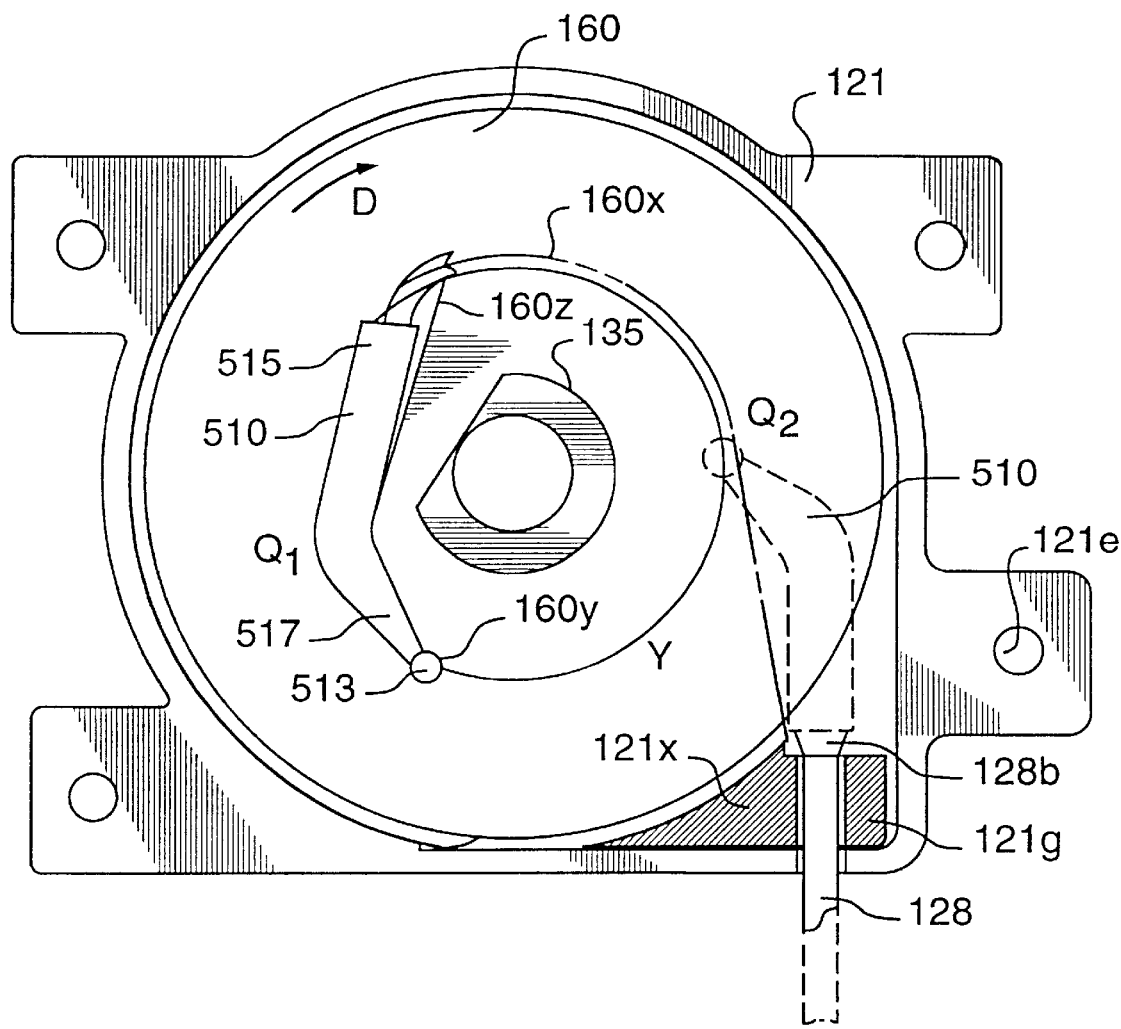
FIG. 16C is a view similar to FIG. 16B illustrating a preferred embodiment for the operation of the anti-rotate feature for the winch.
Figure 16D:
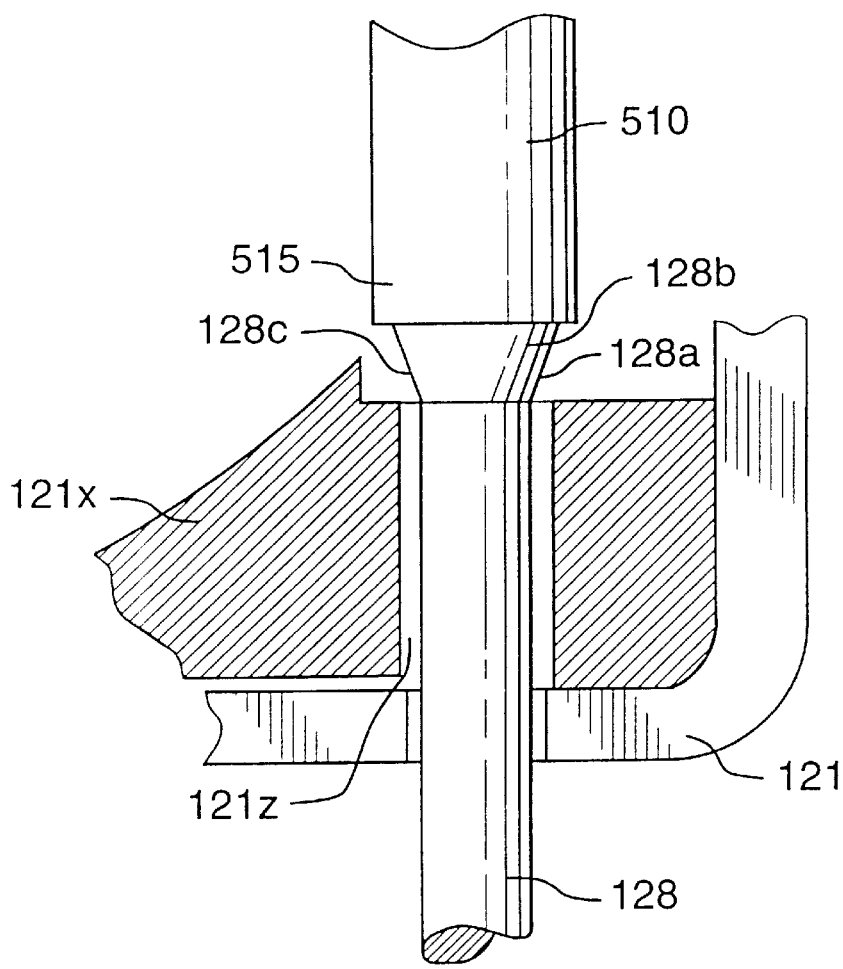
FIG. 16D is a close-up schematic view of the mouth of the winch and the operation of the anti-rotate feature illustrated in a preferred embodiment of the invention.
Figure 16E:
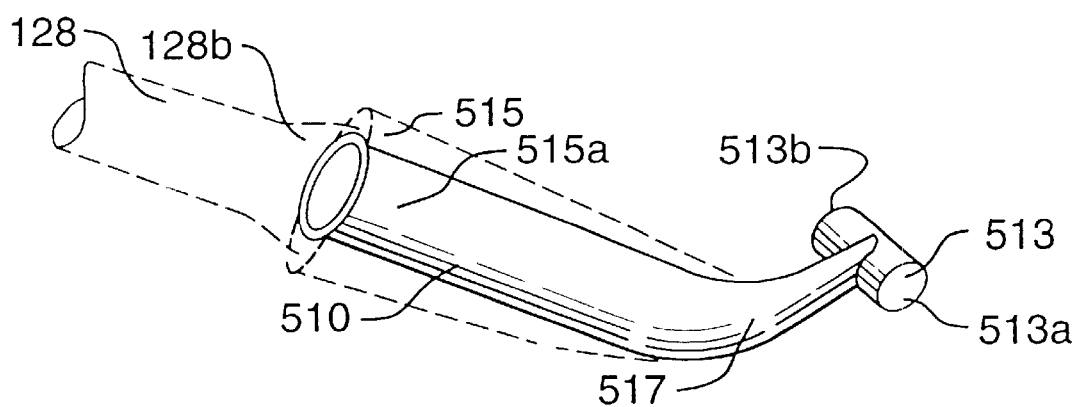
FIG. 16E is a close-up schematic view of the arcuate fitting of the winch and the assembly thereof illustrated in a preferred embodiment of the invention.

Referring now to FIG. 16C, in relation to FIGS. 16D and 16E, there is illustrated a winch housing 121 having a winch reel plate 160 contained therein which has a hub portion 160X formed therewith, and in one embodiment formed from nylon or fiber reinforced nylon or other plastic material. The hub portion 160X is raised laterally from the side of the reel plate 160 as best seen in relation to FIG. 15. An opening is provided at 160Y in the raised hub portion 160X of the reel plate 160. The shaft 135 extends through an opening adjacent the center of the hub. The cable 128 is payed out and taken up on the hub 160X as the winch is rotated. The cable has an arcuate fitting 510 provided at the end thereof substantially as shown in FIG. 16E. The arcuate fitting has an end 515 which is clamped to the end 128B of the cable 128. As the end 515A is flattened by the clamping action, so is the portion of cable 128 nearest the flattened portion 515 of the arcuate fitting 510. The other end of the arcuate fitting 510 has provided therewith a substantially hammer shaped pin 513 having two ends 513A and 513B which fit within openings 160Y and a cooperative opening (not shown) as may be best inferred from FIG. 11. The end of the arcuate fitting nearest the hammer head pin 513 tapers from the main body of the arcuate fitting 510 at a neck 517 to the hammer head pin 513. The arcuate shape of the fitting therefore allows the arcuate fitting 510 to abut the left edge of the discontinuous hub 160X thus completing the hub to allow the cable anchored at opening 160Y at pin 513 to accumulate upon itself in coiled fashion. The fitting 510 therefore in the position labelled as Q1 acts as a portion which completes the circumference of the hub 160X. However, when the cable is completely payed out as is the case at position Q2, then the arcuate fitting 510 will pivot as best seen in FIG. 16C at the Q2 position to extend along with the cable 128 toward the mouth 121G of the winch housing 121. A supplementary portion 121X as best seen in FIG. 16D is located adjacent the mouth 121G of the housing 121. This supplementary portion 121X includes an opening therethrough 121Z which is larger than the diameter of the cable 128. However, when the cable is fully payed out as in position Q2 of FIG. 16C, then the flattened portion 128B of the cable 128 will enter the opening 121Z wherein the side walls 128C will abut the material of the supplementary portion 121X adjacent the opening 121Z thereby preventing any further rotation of the reel 160 in the paying out direction for the cable thereby preventing the cable from backdriving upon itself within the reel 160, and thus risking damaging the cable.

Figure 23A:
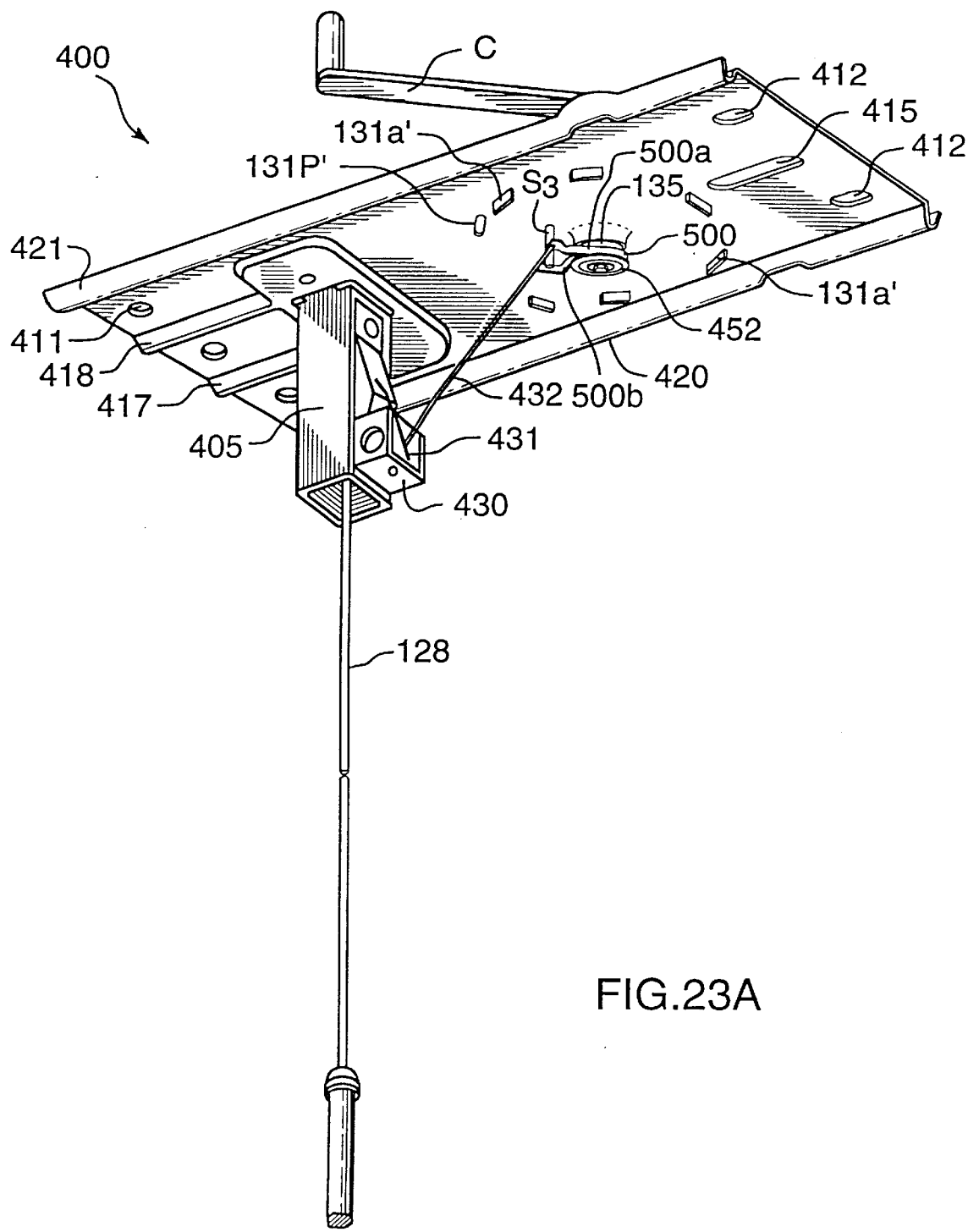
FIGS. 23A and 23B are a bottom perspective views of the winch assembly of FIG. 21 illustrated in other preferred embodiments of the invention.
Figure 23B:
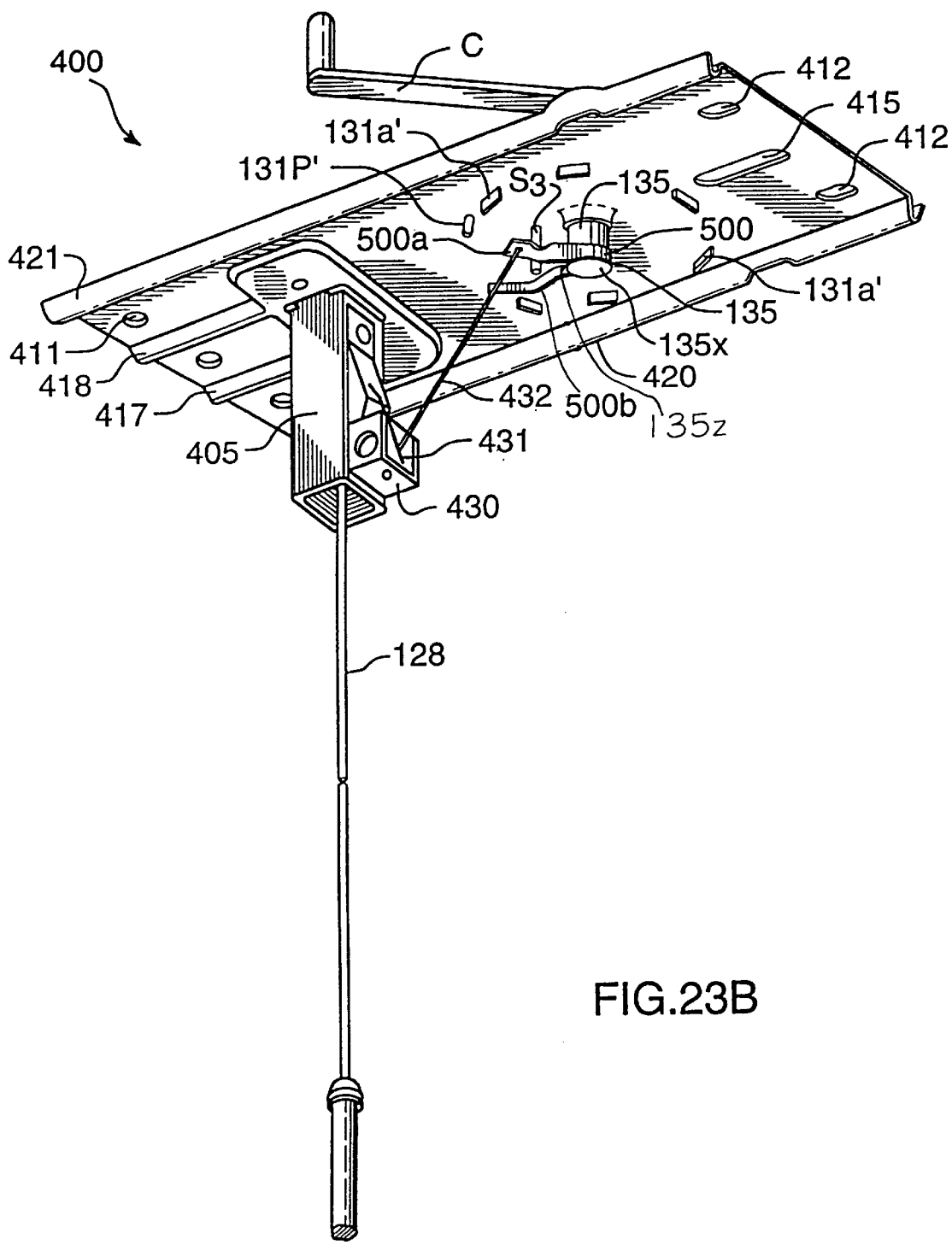
Figures 23C, 23D:
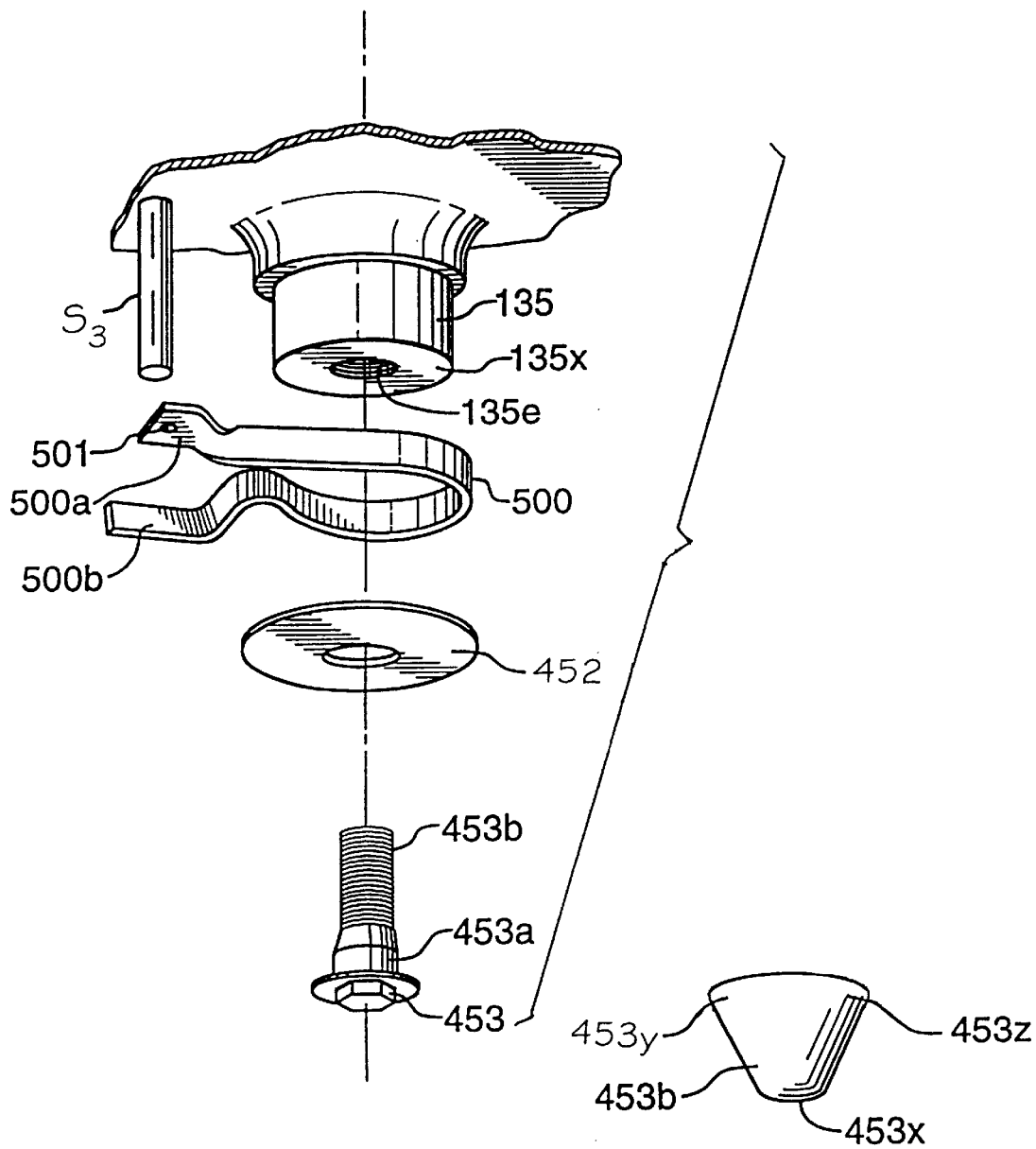
FIG. 23C is a close-up schematic perspective view of the fastening of the winch assembly of FIG. 23A.
FIG. 23D is an end schematic view of the fastener of FIG. 23C.

Referring now to FIGS. 23A, 23B and 23C, there is illustrated an alternative actuating mechanism for the winch assembly of FIG. 21 wherein the shaft 135 has disposed therewith a substantially horseshoe shaped spring steel-like member 500 which frictionally engages the perimeter of the shaft 135. The member has two ends 500A and 500B. The end 500A includes an opening 501 which engages with the operator 432. A stop S3 is provided with the mounting bracket 410 which resides between the legs 500A and 500B at all times. When the winch assembly is operated as is described in relation to FIG. 23, the actuator will rotate in, for example a counterclockwise direction of approximately ¾" so that the latch mechanism 430 will disengage the head of the carrier as has been previously described, and wherein the arm 500B will engage the stop S3 so that continued rotation of the winch provides for the slippage of the member 500 and the continued motion of the winch which allows for paying out the cable. Alternatively, when the winch is rotated in the opposite direction, the arm 500A will engage the stop S3 and the member 500 will slip in relation to the shaft 135 allowing the cable to be taken up. This action is very similar in principle to the description provided previously in relation to FIG. 23 with the exception that the disks have been replaced by a much simpler clip arrangement which slips in relation to the shaft 135.

Referring to FIG. 23B, the member 500 therefore is provided on shaft 135 within an opening or groove 135Z of approximately 1 mm in depth thereby anchoring the member within said groove on the shaft 135. The end 135X therefore does not include any fastening arrangements. However, with respect to FIG. 23A and 23C, the member 500 is inserted over the shaft 135 so that the arms 500A and 500B contain therebetween the stop S3. A washer 452 is then inserted over the end of the shaft 135X aligned with the opening 135E so that the fastener 453 can enter the opening 135E. Consistent with the teachings of U.S. Pat. Nos. 3,918,345 and 3,195,156, the teachings thereof which are hereby incorporated by reference, the opening 135E is not threaded. The fastener 453 has a shank portion 453A and a working portion 453B as best seen in relation to FIG. 23D. The working end 453B of the fastener 453 is provided with three high spots substantially as illustrated proximate the working end thereof. The high spots 453X, 453Y and 453Z therefore, consistent with the above-mentioned patent disclosures, creates a rolled thread within the opening 135E as the fastener is driven into the opening. Therefore a secure fastening of the entire winch assembly of FIG. 21 through 28 and FIGS. 23A, 23C and 23D, is provided.

Alternative embodiments of the actuator may be provided by providing an extension arm attached to or integral with the drive shaft 135 resulting in a similar slipping action to either the operation of the actuator of FIG. 23 or the actuator of FIG. 23A. For example, if a single arm extended from the shaft 135 and could slip in relation thereto, then as long as two stops are provided for that arm and the arm had an opening to engage with the operator 432, then the functionality would be identical. Similarly, a collar or cap which frictionally engaged the end of the shaft 135 anchored in the 1 mm groove (provided for the preferred spring steel member 500) could also include an arm which could operate in essentially the same manner. It is therefore assumed that those skilled in the art in reading all of the various actuating mechanisms provided with this disclosure could readily conceive of many equivalent actuators to those described herein having read this disclosure and having the full knowledge of the disclosure, and the art.

Figure 34:
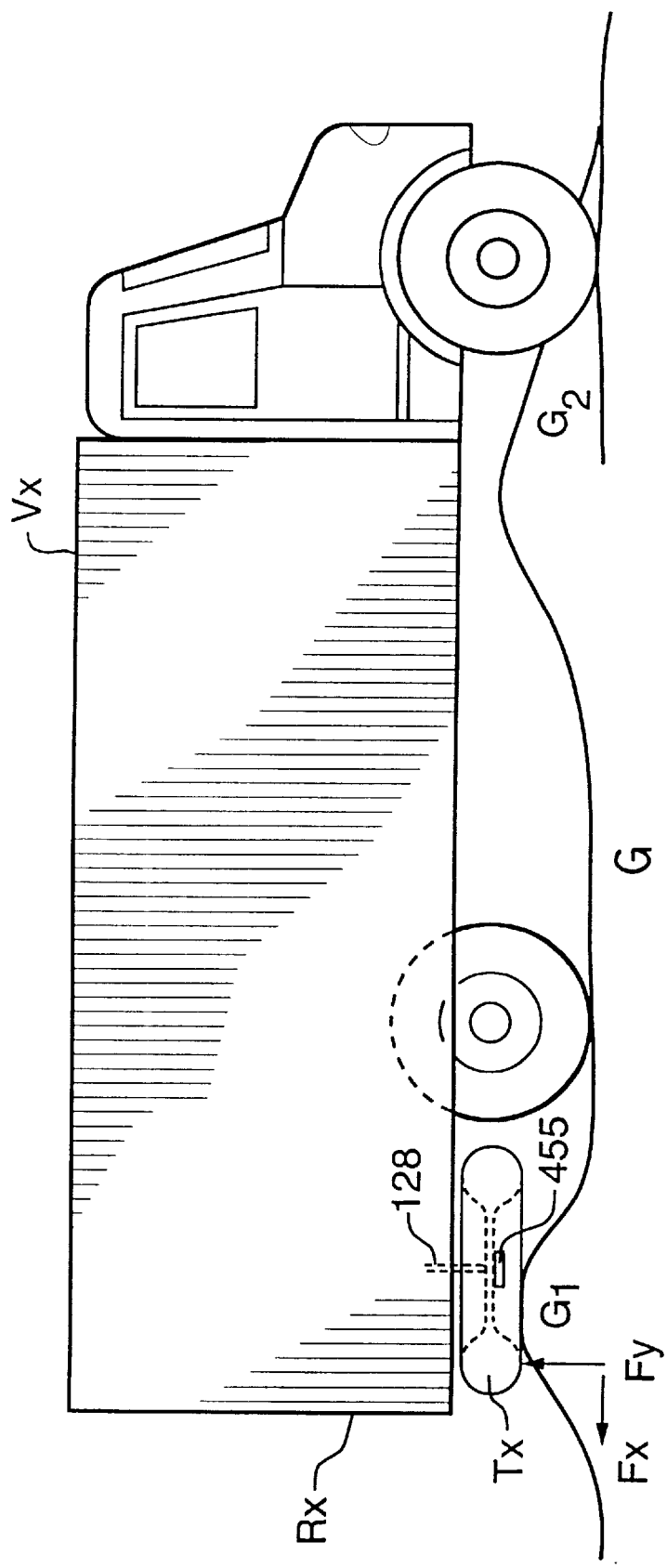
FIG. 34 is a schematic view of the installation of the winch assembly of FIG. 21 in a van VX and illustrated in a preferred embodiment of the invention.

Referring now to FIG. 34, there is illustrated a vehicle VX having provided near the rear RX thereof a winch assembly similar to any winch assembly as described in relation to FIGS. 21 through 28 located with respect to the truck in a manner similar to that illustrated with respect to FIG. 31 and installed in the vehicle consistent with the illustration and description of the assembly described in relation to FIG. 33.

Therefore, as the vehicle VX passes over rough terrain or ground G and passes a number of hills G1 and G2, the tire TX may bottom out or scuff the apex of the hilly portion G1 of the ground G. The tire TX which is already under compression under the vehicle as a result of winding the tire up in the stored position via cable 128. An impact force due to scuffing the tire on the ground G will cause further compression of the tire at the point of impact about the side wall of the tire potentially causing a twisting of the tire on the winch assembly. Further, the motion of the vehicle VX in a forward direction will cause a force to be imparted on the side wall of the tire in a direction opposite to the direction of travel of the truck. This scuffing force therefore must be resolved upon the winch assembly, at least in part, to prevent the loss of the tire. The tire TX when it is in the stored position abuts the frame members B1 and B2 as best seen in relation to FIG. 33. The tire is therefore placed under compression at the side walls which force is created through the tensioning of the flexible cable 128 when the winch is operated and the tire is stored in the storage position. When the tire is subjected to the external forces tending to displace the tire from the stored position, illustrated as forces FX and FY in FIG. 34, these forces will be resisted by the structure of the winch assembly. The mounting bracket 410 mounted to the frame members, the tire carrier 455, the flexible member 128, the latch 430 and the latch tube 405 will resolve the forces FX and FY in part to the frame of the vehicle and in the preferred embodiment deforming in part the latch tube 405 and the latch 430 should the flexible cable 128 break risking release of the tire. Although the scuffing force may cause the cable to break, at speeds up to 35 miles per hour to date the tire has remained safely contained within the winch assembly.

As many changes can be made to the invention without departing from the scope of the invention, it is intended that all material contained herein by interpreted as illustrative of the invention and not in a limiting sense.

The embodiments of the invention in which an exclusive property or privilege is claimed are as follows:

1. A winch assembly comprising:
    a winch; and
    a carrier for a tire including a tube having a first and second end and having an opening extending from the first end to the second end, the tube having an enlarged head disposed proximate said first end of the tube and having a flared flanged end disposed proximate the second end of the tube, the enlarged end of the tube including a detent for engagement with a latch of said winch, the carrier having a wheel retaining portion providing a base upon which the tire will rest in use, said base including an opening extending there through, through which said tube is inserted from the first end to the second end, said opening of said wheel retainer being large enough to receive the first end of the tube but will not allow the second end to pass, the tube in use having a flexible member extending there through with a retaining nut provided proximate the end of the flexible member in use and disposed adjacent the opening of the second end of the tube to prevent pulling the flexible member through the tube in use, wherein said carrier is adapted to retain a spare tire in said winch assembly and to readily release the spare tire from the carrier for user access.

2. The winch assembly of claim 1 wherein the tube and base are adapted to carry multiple sizes of tires.

3. The winch assembly of claim 1 wherein said wheel retainer includes a plurality of reinforcing ribs to rigidify the wheel retainer.

4. A winch assembly comprising:
    a winch coupled to a bracket for letting out and taking up a flexible member, said winch being adapted to move a tire from a stored position to an accessible position; and a carrier having a first member and a second member, each of said first and second members having an aperture extending therethrough, said flexible member extending through each of said apertures, wherein said first and second members are captured between said winch and a stop coupled to the distal end of said flexible member, wherein said first and second members are separable from one another and moveable along the length of the flexible member, wherein said first member includes a first end disposable through said aperture of said second member and a second end which may not pass through said aperture of said second member, said second member being rotatable to allow said second member to pass through an aperture of said tire; and a latch coupled to one of said bracket and said first member wherein said latch engages the other of said bracket and said first member upon said tire being moved toward said stored position and wherein said first member is disengagable from said bracket to allow said tire to be moved to said accessible position.

5. The winch assembly of claim 4 wherein said second member is in a first orientation relative to said tire to retain said tire in said stored position and wherein said second member is in a second orientation relative to said tire when being passed through said aperture in said tire.

6. The winch assembly of claim 5 wherein said first orientation of said second member is substantially orthogonal to said second orientation of said second member.

7. The winch assembly of claim 4 wherein said stop engages said second end of said first member, and wherein said second end of said first member engages said second member and wherein said second member engages said tire when said tire is in said stored position.

8. A winch assembly for raising and lowering a wheel having an aperture from an accessible position to a stored position, the winch assembly comprising:

a flexible member having a first end and a second end;

a winch for taking up and letting out said flexible member, wherein said first end of said flexible member is coupled to said winch;

a first member having a first end, a second end and a passageway extending from said first end to said second end;

a second member having a bore extending therethrough;

a nut coupled to said second end of said flexible member, wherein said flexible member extends through said passageway and said bore such that said first member and said second member are captured between said winch and said nut, wherein said first end of said first member selectively extends through said bore and wherein said second end of said first member is sized not to pass through said bore, wherein said second member is adapted to pass through the wheel aperture when positioned in a first orientation and adapted not to pass through the wheel aperture when positioned in a second orientation; and a bracket having a latch, wherein said first end of said first member includes an enlarged portion having a detent and wherein said latch selectively engages said detent to couple said first member to said bracket when the wheel is in the stored position.

9. The winch assembly of claim 8 wherein said second member is positioned in said second orientation when the wheel is in the stored position.

10. The winch assembly of claim 8 wherein said latch selectively couples said first member and said second member to said bracket to retain the wheel in the stored position regardless of the structural integrity of said flexible member.

* * * * *